US008877875B2

(12) United States Patent
Kamino et al.

(10) Patent No.: US 8,877,875 B2
(45) Date of Patent: Nov. 4, 2014

(54) GOLF BALL

(75) Inventors: Kazuya Kamino, Kobe (JP); Keiji Ohama, Kobe (JP); Toshiyuki Tarao, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 1048 days.

(21) Appl. No.: 12/289,953

(22) Filed: Nov. 7, 2008

(65) Prior Publication Data
US 2009/0124420 A1    May 14, 2009

(30) Foreign Application Priority Data

Nov. 8, 2007 (JP) ................................ 2007-291124

(51) Int. Cl.
| A63B 37/12 | (2006.01) |
| A63B 37/00 | (2006.01) |
| C08L 75/04 | (2006.01) |
| C08G 18/83 | (2006.01) |
| C08G 18/70 | (2006.01) |
| C08G 18/10 | (2006.01) |
| C08G 18/48 | (2006.01) |
| C08L 33/10 | (2006.01) |
| C08L 67/00 | (2006.01) |

(52) U.S. Cl.
CPC ............. *C08L 75/04* (2013.01); *A63B 37/0075* (2013.01); *A63B 37/0033* (2013.01); *C08L 33/10* (2013.01); *C08L 67/00* (2013.01); *C08G 18/708* (2013.01); *C08G 18/10* (2013.01); *C08G 18/4854* (2013.01); *A63B 37/0063* (2013.01); *A63B 37/0031* (2013.01); *A63B 37/0023* (2013.01)
USPC ........... 525/458; 525/127; 525/129; 525/130; 525/440.01; 525/440.11; 525/457; 473/373; 473/374

(58) Field of Classification Search
None
See application file for complete search history.

(56) References Cited

U.S. PATENT DOCUMENTS

| 3,395,109 | A | | 7/1968 | Molitor et al. |
| 3,989,568 | A | | 11/1976 | Isaac |
| 4,123,061 | A | | 10/1978 | Dusbiber |
| 4,248,432 | A | | 2/1981 | Hewitt et al. |
| 4,347,338 | A | * | 8/1982 | Torii et al. ..................... 525/123 |
| 5,334,673 | A | | 8/1994 | Wu |
| 5,553,852 | A | | 9/1996 | Higuchi et al. |
| 5,947,844 | A | | 9/1999 | Shimosaka et al. |
| 6,123,534 | A | | 9/2000 | Kasashima et al. |
| 6,123,628 | A | | 9/2000 | Ichikawa et al. |
| 6,258,310 | B1 | * | 7/2001 | Sardanopoli et al. .... 264/211.23 |
| 6,346,053 | B1 | | 2/2002 | Inoue et al. |
| 6,620,059 | B2 | | 9/2003 | Sasaki et al. |
| 6,685,456 | B2 | | 2/2004 | Sajima |
| 6,747,100 | B2 | | 6/2004 | Ichikawa et al. |
| 6,764,415 | B2 | | 7/2004 | Ichikawa et al. |
| 6,806,323 | B2 | | 10/2004 | Ichikawa et al. |
| 6,966,850 | B2 | | 11/2005 | Watanabe et al. |
| 6,992,145 | B2 | | 1/2006 | Ichikawa et al. |
| 7,052,415 | B2 | | 5/2006 | Sasaki et al. |
| 7,090,799 | B2 | | 8/2006 | Takesue et al. |
| 7,140,979 | B2 | | 11/2006 | Umezawa et al. |
| 7,322,892 | B1 | | 1/2008 | Watanabe et al. |
| 7,335,115 | B1 | * | 2/2008 | Watanabe et al. ............. 473/376 |
| 7,344,454 | B2 | | 3/2008 | Umezawa et al. |
| 2002/0094886 | A1 | | 7/2002 | Sajima |
| 2003/0045375 | A1 | | 3/2003 | Sasaki et al. |
| 2003/0064832 | A1 | | 4/2003 | Ichikawa et al. |
| 2004/0106473 | A1 | | 6/2004 | Hayashi et al. |
| 2005/0181891 | A1 | | 8/2005 | Umezawa et al. |
| 2005/0187038 | A1 | | 8/2005 | Sasaki et al. |
| 2006/0252579 | A1 | * | 11/2006 | Umezawa et al. ............. 473/371 |
| 2006/0270492 | A1 | * | 11/2006 | Higuchi et al. ................ 473/371 |
| 2007/0010351 | A1 | | 1/2007 | Umezawa et al. |
| 2007/0129174 | A1 | | 6/2007 | Higuchi |
| 2007/0142127 | A1 | * | 6/2007 | Tarao ............................ 473/371 |
| 2008/0161134 | A1 | * | 7/2008 | Tarao ............................ 473/378 |

(Continued)

FOREIGN PATENT DOCUMENTS

| JP | 51-74726 A | 6/1976 |
| JP | 58-2063 B2 | 1/1983 |

(Continued)

OTHER PUBLICATIONS

HDI trimer datasheet form www.wernerblank.com ; no date.*
Notice of Allowance for U.S. Appl. No. 12/289,957 dated May 10, 2011.
Office Action for U.S. Appl. No. 12/003,598 dated Aug. 31, 2010.
Office Action for U.S. Appl. No. 12/003,598 dated Feb. 23, 2011.
Office Action for U.S. Appl. No. 12/289,956 dated Apr. 29, 2011.
Japanese Office Action with the English translation dated Nov. 8, 2011, for Application No. 2007-190111.
Japanese Office Action with the English translation dated Nov. 8, 2011, for Application No. 2007-190112.
Japanese Office Action with the English translation dated Nov. 8, 2011, for Application No. 2007-291124.
Office Action for U.S. Appl. No. 12/003,598 dated May 7, 2012.
Japanese Office Action with the English translation dated Aug. 21, 2012, for Application No. 2007-291124.

*Primary Examiner* — David Buttner
(74) *Attorney, Agent, or Firm* — Birch, Stewart, Kolasch & Birch, LLP

(57) ABSTRACT

The object of the present invention is to provide a golf ball that satisfies both of the flight distance at the shot with a driver, a long iron, and a middle iron and the controllability at the approach shot with a short iron and is also excellent in the abrasion resistance of the cover. The present invention provides a golf ball comprising a core consisting of a center and at least one intermediate layer covering the center, and a cover covering the core, wherein the cover is formed from a cover composition containing, as a resin component, a thermoplastic polyurethane (A) and a polyisocyanate mixture (B) in which a urethane prepolymer (b-1) having at least two isocyanate groups or a polyisocyanate (b-2) having at least three isocyanate groups is dispersed in a thermoplastic resin (b-3) which does not substantially react with an isocyanate group; and wherein the cover composition has a slab hardness of 60 or less in Shore D hardness, and the core has a hardness difference (Hs−Ho) between a surface hardness Hs and a center hardness Ho of from 15 to 50 in Shore D hardness.

13 Claims, 3 Drawing Sheets

(56) References Cited

U.S. PATENT DOCUMENTS

| | | | |
|---|---|---|---|
| 2009/0111608 A1* | 4/2009 | Watanabe et al. | 473/373 |
| 2009/0124420 A1 | 5/2009 | Kamino et al. | |
| 2009/0124421 A1 | 5/2009 | Hirau et al. | |
| 2009/0124430 A1 | 5/2009 | Hirau et al. | |
| 2009/0221387 A1 | 9/2009 | Ohama et al. | |
| 2009/0247326 A1 | 10/2009 | Ohama et al. | |
| 2009/0247328 A1 | 10/2009 | Kamino et al. | |

FOREIGN PATENT DOCUMENTS

| | | |
|---|---|---|
| JP | 7-24085 A | 1/1995 |
| JP | 2662909 B2 | 6/1997 |
| JP | 9-215778 A | 8/1997 |
| JP | 10-99469 A | 4/1998 |
| JP | 11-89967 A | 4/1999 |
| JP | 11-137727 A | 5/1999 |
| JP | 11-178949 A | 7/1999 |
| JP | 2000-279553 A | 10/2000 |
| JP | 2002-159598 A | 6/2002 |
| JP | 2002-336378 A | 11/2002 |
| JP | 2002-336380 A | 11/2002 |
| JP | 2002-336386 A | 11/2002 |
| JP | 2002-355342 A | 12/2002 |
| JP | 2003-764 A | 1/2003 |
| JP | 2003-70936 A | 3/2003 |
| JP | 2004-16583 A | 1/2004 |
| JP | 2004-97581 A | 4/2004 |
| JP | 2004-180793 A | 7/2004 |
| JP | 2004-305755 A | 11/2004 |
| JP | 2005-224514 A | 8/2005 |
| JP | 2005-230375 A | 9/2005 |
| JP | 2005-253962 A | 9/2005 |
| JP | 2006-344 A | 1/2006 |
| JP | 2007-159997 A | 6/2007 |
| JP | 2009-201896 A | 9/2009 |
| JP | 2009-226115 A | 10/2009 |
| JP | 2009-226122 A | 10/2009 |

* cited by examiner

GOLF BALL

BACKGROUND OF THE INVENTION

The present invention relates to a golf ball, more particularly to a technology of improving the abrasion resistance as well as making the flight distance compatible with the controllability in a golf ball.

DESCRIPTION OF THE RELATED ART

As a base resin constituting a cover of a golf ball, an ionomer resin or polyurethane is used. Covers containing ionomer resins are widely used for their excellent resilience, durability, workability and the like. However, because of their high rigidity and hardness, problems such as bad shot feeling, inadequate spin performance and poor controllability are pointed out. On the other hand, the polyurethane is used as a base resin constituting the cover since it provides an improved shot feeling and spin properties compared with an ionomer resin. For example, Japanese patent publication No. S51-74726 A, Japanese patent No. 2662909 and U.S. Pat. No. 4,123,061 disclose a use of thermosetting polyurethane for a cover, and U.S. Pat. Nos. 3,395,109 and 4,248,432 disclose a use of thermoplastic polyurethane for a cover. Although a golf ball having excellent abrasion-resistance can be obtained when the thermosetting polyurethane is used for a cover, a process of preparing a golf ball will be complicated. Additionally, a golf ball using the thermoplastic polyurethane for a cover is insufficient in abrasion-resistance and durability compared with the golf ball using the thermosetting polyurethane.

Examples of a technology for improving a cover using the thermoplastic polyurethane include Japanese patent publication Nos. H11-178949 A, 2002-336378 A, 2002-336380 A, 2002-336386 A, and 2005-253962 A. Japanese patent publication No. H11-178949 A discloses a solid golf ball comprising a solid core and a cover covering the solid core, wherein a resin component forming the cover comprises a reaction product of a thermoplastic polyurethane elastomer and blocked isocyanate as a main component. Additionally, Japanese patent publication Nos. 2002-336378 A, 2002-336380 A and 2002-336386 A disclose golf balls having a cover made from a composition containing a thermoplastic polyurethane material and an isocyanate mixture in which an isocyanate compound having two or more functional groups in a molecule is dispersed in a thermoplastic resin which does not substantially react with an isocyanate.

Japanese patent publication No. 2005-253962 A discloses a golf ball having a cover comprising, as a main component, a mixture of a thermoplastic resin composition, an isocyanate compound or an isocyanate mixture having two or more isocyanate groups in a molecule as functional groups and a thermoplastic polyurethane elastomer, wherein the thermoplastic resin composition is selected from the group consisting of a thermoplastic block copolymer, a polyester elastomer, a polyamide elastomer, and polyolefin, and is modified with a functional group having reactivity with an isocyanate.

Further, in recent years, golf balls satisfying both of flight distance and controllability have been required. There are Japanese Patent publications Nos. H07-24085 A and 2005-224514 A disclosing golf balls having proper spinning capability in an approach shot and excellent in flight property. Japanese patent publication No. H07-24085 A discloses a three-piece solid golf ball including a center core, an intermediate layer, and a cover wherein the center core has a diameter of 29 mm or wider and a specific gravity of less than 1.4; an intermediate layer has a thickness of 1 mm or thicker, a specific gravity of less than 1.2, and a JIS-C hardness of 85 or higher; the cover has a thickness of 1 to 3 mm; and the specific gravity of the intermediate layer is lower than the specific gravity of the center core. Further, Japanese patent publication No. 2005-224514 A discloses a three-piece solid golf ball including a solid core, an intermediate layer covering the core, and a cover covering the intermediate layer and having a large number of dimples formed thereon wherein the core shows a deformation amount of 3.4 to 4.1 mm in the case a load of 10 kg to 130 kg is applied to the core: the intermediate layer has a surface hardness in Shore D hardness of 64 to 69: the cover layer is formed using a thermoplastic polyurethane as a main material and has a lower hardness than the intermediate layer with a hardness difference of 10 to 16 from that of the intermediate layer in Shore D hardness: the total thickness of the intermediate layer and the cover layer is 2.2 to 3.0 mm: the cover layer has a thickness of 0.8 to 1.3 mm and the golf ball includes at least four types of dimples different in diameter and/or depth in a total number of from 250 to 390 and having an average depth of 0.14 to 0.17 mm.

SUMMARY OF THE INVENTION

However, the golf balls disclosed in Japanese patent publication No. S51-74726, Japanese Patent No. 2662909, U.S. Pat. Nos. 4,123,061, 3,395,109, and 4,248,432, and Japanese patent publications Nos. 11-178949 A, 2002-336378 A, 2002-336380 A, 2002-336386 A, 2005-253962 A, H07-24085 A and 2005-224514 A are insufficient in the balance of flight distance, controllability, and abrasion resistance and there still remains room for improvement.

In view of the above-mentioned state of the art, the object of the present invention is to provide a golf ball that satisfies both of the flight distance at the shot with a driver, a long iron, and a middle iron and the controllability at the approach shot with a short iron and is also excellent in the abrasion resistance of the cover.

The present invention, which solves the above-mentioned problems, provides a golf ball comprising a core consisting of a center and at least one intermediate layer covering the center, and a cover covering the core, wherein the cover is formed from a cover composition containing, as a resin component, a thermoplastic polyurethane (A) and a polyisocyanate mixture (B) in which a urethane prepolymer (b-1) having at least two isocyanate groups or a polyisocyanate (b-2) having at least three isocyanate groups is dispersed in a thermoplastic resin (b-3) which does not substantially react with an isocyanate group; and wherein the cover composition has a slab hardness of 60 or less in Shore D hardness, and the core has a hardness difference (Hs−Ho) between a surface hardness Hs and a center hardness Ho of from 15 to 50 in Shore D hardness.

That is, according to the present invention, a golf ball with a high launch angle and a low spin degree (hereinafter, sometimes referred to as a "spin rate") at the shot with a driver, a long iron and a middle iron can be obtained by employing the hard-outer soft-inner core structure which has a hardness distribution. As a result, high launch angle can be obtained at the shot with a driver, a long iron and a middle iron. Further, since the cover of the golf ball of the present invention is formed from the cover composition with a slab hardness of 60 or lower in Shore D hardness, a high spin rate can be realized at the approach shot with a short iron or the like. Therefore, the golf ball is excellent in the controllability at the approach shot. Further, generally, if a soft material is employed as a resin component of a cover material, the abrasion resistance tends to be lowered. However, in the golf ball of the present invention, since the thermoplastic polyurethane to be used as a resin component for the cover is crosslinked with the polyisocyanate mixture, the abrasion resistance of the cover is excellent. Further, as the polyisocyanate mixture, a polyisocyanate mixture in which a urethane prepolymer (b-1) having at least two isocyanate groups or a polyisocyanate (b-2) having at least three isocyanate groups is dispersed into a thermoplastic resin (b-3) which substantially does not react with an isocyanate group is used, so that the crosslinking reaction is suppressed at the time of molding the cover and thereafter the crosslinking reaction is promoted and consequently, the abrasion resistance of the cover can be improved without lowering productivity of the golf ball.

The thickness of the cover of the golf ball of the present invention is preferably 0.1 mm or more and 0.8 mm or less and more preferably 0.5 mm or less. The core can be made to have a large diameter by thinning the cover thickness and thus the repulsion property of the golf ball can be improved. As a result, the flight distance can be made longer.

The slab hardness of the cover composition is preferably 50 or less and more preferably 40 or less in Shore D hardness. The spin rate at the approach shot can be increased by lowering the slab hardness of the cover composition. As a result, a golf ball having further excellent controllability can be obtained.

The NCO content (NCO %) of the polyisocyanate mixture (B) is preferably 0.1 mass % or more and 30.0 mass % or less. Particularly, in the case the polyisocyanate mixture (B) contains the urethane prepolymer (b-1), the NCO content (NCO %) of the polyisocyanate mixture (B) is preferably 0.1 mass % or more and 10.0 mass % or less, and in the case the polyisocyanate mixture (B) contains the polyisocyanate (b-2), the NCO content (NCO %) of the polyisocyanate mixture (B) is preferably 5.0 mass % or more and 30.0 mass % or less. The crosslinking density can be controlled and a cover excellent in abrasion resistance can be obtained by adjusting the isocyanate group content in the above-mentioned ranges.

The NCO content (NCO %) of the urethane prepolymer (b-1) is preferably 0.5 mass % or more and 10.0 mass % by or less. Further, the NCO content (NCO %) of the polyisocyanate (b-2) is preferably 10.0 mass % or more and 30.0 mass % or less.

As the urethane prepolymer (b-1), for example, a bifunctional isocyanate group-terminated urethane prepolymer represented by the following formula (1) is preferable to be used.

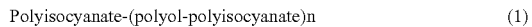

Polyisocyanate-(polyol-polyisocyanate)n    (1)

In the formula (1), the connecting number n is an integer of not less than 1 and not higher than 10.

Further, the number average molecular weight of the polyol component composing the urethane prepolymer (b-1) is preferably 650 or more. If the number average molecular weight of the polyol component is 650 or more, the distance between crosslinking points in the crosslinking reaction is widened and the abrasion resistance and durability can be further improved without making the resultant polyurethane cover too hard.

The cover composition preferably contains the polyisocyanate mixture (B) in an amount of 1 to 50 parts to 100 parts by mass of the thermoplastic polyurethane (A). If the content of the polyisocyanate mixture (B) is within the above-mentioned range, a sufficient crosslinking structure can be obtained and the crosslinking density does not become too high and the durability can be improved.

The mixing ratio (100% by weight in total) of the urethane prepolymer (b-1) or the polyisocyanate (b-2) to the thermoplastic resin (b-3) in the polyisocyanate mixture (B) is preferably (urethane prepolymer (b-1) or polyisocyanate (b-2))/thermoplastic resin (b-3)=(5 mass % to 50 mass %)/(50 mass % to 95 mass %). If the mixing ratio of the urethane prepolymer (b-1) or the polyisocyanate (b-2) to the thermoplastic resin (b-3) is within the above-mentioned range, a desired crosslinking structure can be obtained and the crosslinking density does not become too high and the durability can be improved.

The thermoplastic resin (b-3) is preferably at least one selected from the group consisting of a polyester elastomer, an acrylic elastomer, a styrene elastomer, an olefin elastomer, and a vinyl chloride elastomer.

According to the present invention, a golf ball that satisfies both of the flight distance at the shot with a driver, a long iron, and a middle iron and the controllability at the approach shot with a short iron and also is excellent in the abrasion resistance of the cover can be obtained.

Particularly, the cover of the golf ball of the present invention is excellent in the abrasion resistance although the cover is soft and very thin.

DETAILED DESCRIPTION OF THE PREFERRED EMBODIMENTS

Figure 1:
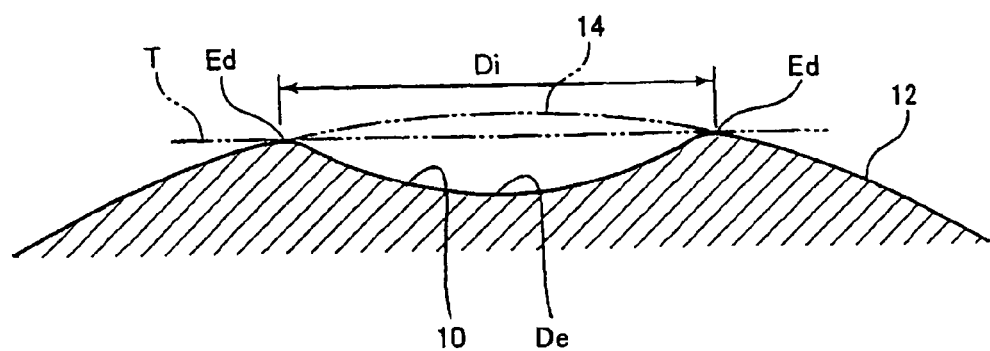
FIG. 1 is an expanded cross-sectional view of a dimple formed on a surface of a golf ball.

The present invention is directed to a golf ball comprising a core consisting of a center and at least one intermediate layer covering the center, and a cover covering the core, wherein the cover is formed from a cover composition containing, as a resin component, a thermoplastic polyurethane (A) and a polyisocyanate mixture (B) in which a urethane prepolymer (b-1) having at least two isocyanate groups or a polyisocyanate (b-2) having at least three isocyanate groups is dispersed in a thermoplastic resin (b-3) which does not substantially react with an isocyanate group; and wherein the cover composition has a slab hardness of 60 or less in Shore D hardness, and the core has a hardness difference (Hs−Ho) between a surface hardness Hs and a center hardness Ho of from 15 to 50 in Shore D hardness.

The cover of the golf ball of the present invention will be described. The cover of the golf ball of the present invention is formed from a cover composition containing, as a resin component, a thermoplastic polyurethane (A) and a polyisocyanate mixture (B) in which a urethane prepolymer (b-1) having at least two isocyanate groups or a polyisocyanate (b-2) having at least three isocyanate groups is dispersed into a thermoplastic resin (b-3) which substantially does not react with an isocyanate group and the cover composition has a slab hardness of 60 or less in Shore D hardness.

First, the thermoplastic polyurethane (A) will be explained. The thermoplastic polyurethane (A) used in the present invention is not particularly limited, as long as it has a plurality of urethane bonds in a molecule and exhibits thermoplasticity. For example, the thermoplastic polyurethane is a reaction product obtained by reacting a polyisocyanate with a polyol to form urethane bonds in a molecule thereof, where necessary, obtained by further carrying out a chain extension reaction with a polyol, a polyamine or the like having a low-molecular weight.

The polyisocyanate component, which constitutes the thermoplastic polyurethane (A), is not limited as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene-diisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane (A). A use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane (A), a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in abrasion-resistance can be obtained.

The polyol component constituting the thermoplastic polyurethane (A) is not particularly limited as long as it has a plurality of hydroxyl groups, and such examples include a low-molecular weight polyol and a high-molecular weight polyol. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, an aniline diol, and bisphenol A diol; a triol such as glycerin, trimethylol propane, and hexanetriol; a tetraol or a hexanol such as pentaerythritol and sorbitol. Examples of the high-molecular weight polyol include a polyether polyol such as polyoxyethylene glycol (PEG), polyoxypropylene glycol (PPG), and polyoxytetramethylene glycol; a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them.

A number average molecular weight of the high-molecular weight polyol is not particularly limited, and for example, it is preferably 400 or more, more preferably 1,000 or more. If the number average molecular weight of the high-molecular weight polyol is too small, the resultant polyurethane becomes too hard and the shot feeling of the golf ball is lowered. The upper limit of the number average molecular weight of the high molecular weight polyol is not particularly limited, and it is preferably 10,000, more preferably 8,000.

The polyamine component that constitutes the thermoplastic polyurethane where necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyl-toluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The thermoplastic polyurethane (A) has no limitation on the constitutional embodiments thereof. Examples of the constitutional embodiments are the embodiment where the polyurethane consists of the polyisocyanate component and the high-molecular weight polyol component; the embodiment where the polyurethane consists of the polyisocyanate component, the high-molecular weight polyol component and the low-molecular weight polyol component; and the embodiment where the polyurethane consists of the polyisocyanate component, the high-molecular weight polyol component, the low-molecular weight polyol component, and the polyamine component; and the embodiment where the polyurethane consists of the polyisocyanate component, the high-molecular weight polyol component and the polyamine component.

The slab hardness of the thermoplastic polyurethane (A) is preferably, in Shore D hardness, 15 or more and more preferably 17 or more and is preferably 50 or less, more preferably 45 or less, and even more preferably 42 or less. If the hardness of the thermoplastic polyurethane (A) is too low, the spin rate at the shot with a driver is sometimes increased. Further, if the hardness of the thermoplastic polyurethane (A) is too high, the spin degree at the time of shot with an approach wedge is sometimes decreased too much. Specific examples of the thermoplastic polyurethane (A) include Elastollan XNY90A, XNY75A, ET880 manufactured by BASF Japan, and the like.

Next, the polyisocyanate mixture (B) in which a urethane prepolymer (b-1) having at least two isocyanate groups or a polyisocyanate (b-2) having at least three isocyanate groups is dispersed into a thermoplastic resin (b-3) which substantially does not react with an isocyanate group will be described.

The urethane prepolymer (b-1) is not particularly limited, as long as it is a compound having a plurality of urethane bonds in a molecule thereof and two or more isocyanate groups, and having a lower molecular weight than that of the thermoplastic polyurethane (A). Such examples include an isocyanate group-terminated urethane prepolymer having urethane bonds formed in a molecule thereof by, for example, reacting a polyisocyanate and a polyol under a condition wherein the polyisocyanate is in excess. The blending ratio of the polyisocyanate component to the polyol component is preferably 1.1 or more, more preferably 1.2 or more, even more preferably 1.3 or more, and is preferably 3.0 or less, more preferably 2.5 or less, even more preferably 2.0 or less in a molar ratio (NCO/OH) of the isocyanate group (NCO) of the polyisocyanate component to the hydroxyl group (OH) of the polyol component.

The polyisocyanate component used as a raw material for the urethane prepolymer (b-1) is not limited, as long as the polyisocyanate has at least two isocyanate groups. Examples of the polyisocyanate component include polyisocyanates exemplified as the polyisocyanate constituting the thermoplastic polyurethane (A). The polyol component used as a raw material for the urethane prepolymer (b-1) is not limited, as long as the polyol component has a plurality of hydroxyl groups. Examples of the polyol component include polyols such as a high-molecular weight polyol and a low-molecular weight polyol exemplified as the polyol component constituting the thermoplastic polyurethane (A).

The isocyanate group-terminated urethane prepolymer used as the urethane prepolymer (b-1) includes TDI based urethane prepolymer, MDI based urethane prepolymer, and $H_{12}MDI$ based urethane prepolymer. Preferably used is MDI based urethane prepolymer or $H_{12}MDI$ based urethane prepolymer. Herein, TDI based urethane prepolymer means an isocyanate group terminated urethane prepolymer obtained by reacting TDI or a polyisocyanate compound containing TDI as a main component with a polyol (preferably PTMG); MDI based urethane prepolymer means an isocyanate group terminated urethane prepolymer obtained by reacting MDI or a polyisocyanate compound containing MDI as a main component with a polyol (preferably PTMG), and $H_{12}MDI$ based urethane prepolymer means an isocyanate group terminated urethane prepolymer obtained by reacting $H_{12}MDI$ or a polyisocyanate compound containing $H_{12}MDI$ with a polyol (preferably PTMG).

For a reaction between the polyisocyanate component and the polyol component, a catalyst which is publicly known for being used in the urethane reaction can be used. Examples of the catalyst include a monoamine such as triethylamine and N,N-dimethylcyclohexylamine; a polyamine such as N,N,N',N'-tetramethylethylenediamine and N,N,N',N'',N''-pentamethyldiethylenetriamine; a cyclic diamine such as 1,8-diazabicyclo[5,4,0]-7-undecene (DBU) and triethylenediamine; a tin catalyst such as dibutyltin dilaurylate and dibutyltin diacetate; an organic carboxylic acid such as acetic acid, azelaic acid, oleic acid and adipic acid.

The urethane prepolymer (b-1) preferably has NCO content (NCO %) of 0.5 mass % or more, more preferably 0.75 mass % or more, even more preferably 1.0 mass % or more, and preferably has NCO content (NCO %) of less than 10.0 mass %, more preferably 9.0 mass % or less, even more preferably 6.0 mass % or less, even more preferably 3.0 mass % or less. If the urethane prepolymer (b-1) has too low NCO content, the effect of the crosslinking may be little and the abrasion-resistance may also become worse, while if the urethane prepolymer has too high NCO content, the viscosity of the cover composition may increase to excess, resulting in lowering the moldability.

NCO content (NCO %) of the urethane prepolymer (b-1) is defined as 100×[number of moles of the isocyanate group in the urethane prepolymer (b-1)×42 (molecular weight of NCO)]/[total amount (g) of the urethane prepolymer (b-1)]

A number average molecular weight of the urethane prepolymer (b-1) is preferably, for example, 1000 or more, more preferably 1500 or more, even more preferably 2000 or more, and is preferably 30000 or less, more preferably 20000 or less, even more preferably 10000 or less. If the number average molecular weight is 1000 or more, a distance between crosslinking points at a time of crosslinking reaction becomes longer, so that the resultant polyurethane cover does not become too hard, thereby improving durability thereof. On the other hand, if the number average molecular weight is more than 30000, crosslinking density becomes low, so that abrasion-resistance of the resultant cover may be lowered.

The number average molecular weight of the polyol component constituting the urethane prepolymer (b-1) is preferably 650 or more, more preferably 700 or more, even more preferably 800 or more, and preferably 10,000 or less, more preferably 5,000 or less, even more preferably 3,000 or less. If the number average molecular weight is 650 or more, a distance between crosslinking points in the crosslinking reaction becomes longer, so that the resultant polyurethane cover does not become too hard, and the durability thereof is improved. On the other hand, if the number average molecular weight is more than 10,000, the crosslinking density becomes low, so that the abrasion-resistance of the resultant cover may be lowered. The number average molecular weight of the urethane prepolymer (b-1) or the polyol component can be measured by Gel permeation Chromatography using two columns of TSK-GEL SUPREH 2500 (TOSOH Corporation) as a column, polystyrene as a standard material, and tetrahydrofuran as an eluate.

The functional number of the isocyanate group of the urethane prepolymer (b-1) used in the present invention is not particularly limited as long as it is at least two, and may be, for example, trifunctional or tetrafunctional. A polyfunctional urethane prepolymer which is at least trifunctional can be obtained by using at least a trifunctional polyol or polyisocyanate as the ones constituting the urethane prepolymer. Among them, in the present invention, it is a preferred embodiment to use a bifunctional isocyanate group-terminated urethane prepolymer represented by the formula (1).

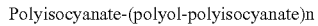

Polyisocyanate-(polyol-polyisocyanate)n　　　(1)

In the formula (1), a connecting number n is preferably 1 or more and 10 or less, more preferably 5 or less, even more preferably 4 or less, further preferably 3 or less. If the connecting number n is 1 or more, a distance between crosslinking points in the crosslinking reaction becomes longer, so that the resultant polyurethane cover does not become too hard, and the durability thereof is improved. On the other hand, if the connecting number n is more than 10, the crosslinking density becomes low, so that the abrasion-resistance of the resultant cover may be lowered.

Examples of the polyisocyanate (b-2) having at least three isocyanate groups include a trifunctional isocyanate such as polymeric MDI, triphenyl methane triisocyanate, tris(isocyanate phenyl)thiophosphate, lysin ester triisocyanate, 1,6,11-undecane triisocyanate, 1,8-diisocyanate-4-isocyanate methyloctane, 1,3,6-hexamethylene triisocyanate, and bicycloheptane triisocyanate; isocyanurate of diisocyanate such as hexamethylene diisocyanate (HDI) and hydrogenated xylylene diisocyanate ($H_6XDI$); an adduct obtained by reacting diisocyanate with a triol having a low-molecular weight such as trimethylol propane or glycerin (free diisocyanate are preferably removed from the adduct); an allophanate modified polyisocyanate; a biuret modified polyisocyanate, and the like. The allophanate modified polyisocyanate is, for example, a trifunctional polyisocyanate obtained by reacting diisocyanate with a diol having a low-molecular weight to form a urethane bond and further reacting the urethane bond with the diisocyanate, and the biuret modified polyisocyanate is, for example, a trifunctional polyisocyanate obtained by reacting a diisocyanate with a diamine having a low-molecular weight to form a urea bond and further reacting the urea bond with the diisocyanate.

The diisocyanate constituting the isocyanurate, the adduct, the biuret modified polyisocyanate or the allophanate modified polyisocyanate is not particularly limited, and includes 2,4-toluene diisocyanate, 2,6-tolylene diisocyanate, 4,4'-diphenylmethane diisocyanate (MDI), 1,5-naphthalene diisocyanate, 2,6-naphthalene diisocyanate, m-phenylene diisocyanate, p-phenylene diisocyanate, tetramethylene diisocyanate, 3,3'-dimethyl-4,4'-biphenylene diisocyanate, 3,3'-dimethoxy-4,4'-biphenylene diisocyanate, xylylene diisocyanate (XDI), tetramethylxylylenediisocyanate (TMXDI), 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI), 4,4'-diisocyanate diphenyl ether, 1,3-diisocyanate methylcyclohexane, 1,4-diisocyanate methylcyclohexane, 1,4-diisocyanate cyclohexane, and the like.

Among them, an isocyanurate of diisocyanate is preferable as the polyisocyanate (b-2), and for example, an isocyanurate of isophorone diisocyanate, hexamethylene diisocyanate or hydrogenated xylylenediisocyanate is more preferable. The polyisocyanate (b-2) may be used alone or as a combination of two or more.

The polyisocyanate (b-2) preferably has NCO content (NCO %) of 10.0 mass % or more, more preferably 12.5 mass % or more, even more preferably 15.0 mass % or more, and preferably has NCO content (NCO %) of 30.0 mass % or less, more preferably 27.0 mass % or less, even more preferably 25.0 mass % or less. If the polyisocyanate (b-2) has too low NCO content, the effect of the improvement may be little and the abrasion-resistance may also become worse, while if the polyisocyanate (b-2) has too high NCO content, the viscosity of the cover composition may increase to excess, resulting in lowering the moldability. NCO content (NCO %) of the polyisocyanate (b-2) is defined as 100×[number of moles of the isocyanate group in the polyisocyanate (b-2)×42 (molecular weight of NCO)]/[total amount (g) of the polyisocyanate (b-2)].

The molecular weight of the polyisocyanate (b-2) is preferably, for example, 200 or more, more preferably 350 or more, even more preferably 500 or more, and preferably 2500 or less, more preferably less than 2000, even more preferably less than 1500, even more preferably less than 1200. The molecular weight of the polyisocyanate (b-2) can be measured by Gel permeation Chromatography.

When the polyisocyanate (b-2) having at least three isocyanate groups is synthesized, a compound having only one or two isocyanate groups may be synthesized at the same time as a byproduct. In such a case, a percentage of the polyisocyanate having three or more isocyanate groups is preferably 70 mass % or more, more preferably 80 mass % or more, even more preferably 90 mass % or more with respect to the total mixture. If the percentage of the polyisocyanate having at least three isocyanate groups is less than 70 mass % with respect to the total mixture, a sufficient crosslinking effect may not be obtained.

The thermoplastic resin (b-3) which does not substantially react with an isocyanate group is not particularly limited as long as it is substantially inactive with an isocyanate group (That is, the thermoplastic resin (b-3) does not substantially have an active hydrogen reactive with an isocyanate group), and such examples include a polystyrene resin, a polyvinylchloride resin, an acrylic resin, an ABS resin, an ester rubber, a polycarbonate resin, a polyester resin (preferably polyethylene terephthalate), polyolefin, polyacetal, a difluoride resin, a tetrafluoride resin, and an ionomer resin. Among them, as the thermoplastic resin (b-2), a thermoplastic elastomer having rubber elasticity is preferable. For example, it is preferred to use at least one kind selected from the group consisting of a polyester elastomer, an acrylic elastomer, a styrene elastomer, an olefin elastomer, and a vinyl chloride elastomer. Examples of the polyester elastomer include "HYTREL" such as "HYTREL 3046", "HYTREL 3548" and "HYTREL 4047" manufactured by DU PONT-TORAY Co or "Primalloy" such as "Primalloy A 1500" manufactured by Mitsubishi Chemical Corporation, and examples of the styrene elastomer include "Rabalon" manufactured by Mitsubishi Chemical Corporation.

In the polyisocyanate mixture, a blending ratio of the urethane prepolymer (b-1) or the polyisocyanate (b-2) to the thermoplastic resin (b-3) (a total of 100 mass %) is preferably: the urethane prepolymer (b-1) or the polyisocyanate (b-2)/thermoplastic resin (b-3)=5 mass % to 50 mass %/50 mass % to 95 mass %, more preferably 10 mass % to 50 mass %/50 mass % to 90 mass %, even more preferably 20 mass % to 45 mass %/55 mass % to 80 mass %. If the blending ratio is outside the above range, a desired cross-linking structure may not be obtained, or the durability may be deteriorated due to the too high crosslinking degree.

NCO content (NCO %) of the polyisocyanate mixture (B) is defined as 100×[number of moles of the isocyanate group in the polyisocyanate mixture (B)×42 (molecular weight of NCO)]/[total amount (g) of the polyisocyanate mixture (B)]. The isocyanate content (NCO %) of the polyisocyanate mixture (B) is preferably 0.1 mass % or more and 30.0 mass % or less.

In the case of the polyisocyanate mixture (B) containing the urethane prepolymer (b-1), the polyisocyanate mixture (B) preferably has NCO content (NCO %) of 0.1 mass % or more, more preferably 0.2 mass % or more, even more preferably 0.3 mass % or more, and preferably has NCO content (NCO %) of 10 mass % or less, more preferably 7.0 mass % or less, even more preferably 5.0 mass % or less. In the case of the polyisocyanate mixture (B) containing the polyisocyanate (b-2), the polyisocyanate mixture (B) preferably has NCO content (NCO %) of 5.0 mass % or more, more preferably 7.0 mass % or more, even more preferably 8.5 mass % or more, and preferably has NCO content (NCO %) of 30.0 mass % or less, more preferably 20.0 mass % or less, even more preferably 12.0 mass % or less. If the NCO content (NCO %) of the polyisocyanate mixture (B) is too low, the effect of the abrasion-resistance may not be obtained due to the small degree of the crosslinking, while if the NCO content (NCO %) is too high, the moldability may be lowered because of the high viscosity of the cover composition.

The cover composition used in the present invention preferably contains the polyisocyanate mixture (B) in an amount of 1 part by mass or more, more preferably 3 parts by mass or more, even more preferably 5 parts by mass or more, and preferably 50 parts by mass or less, more preferably 30 parts by mass or less, even more preferably 20 parts by mass or less based on 100 parts by mass of the thermoplastic polyurethane (A). If the content of the polyisocyanate mixture (B) is outside the above range, a sufficient crosslinked structure may not be obtained, or crosslinking density may become too high, so that durability may be undermined.

The total content of the thermoplastic polyurethane (A) and the polyisocyanate mixture (B) contained in the resin component constituting the cover composition used in the present invention, is preferably 50 mass % or more, more preferably 60 mass % or more, even more preferably 70 mass % or more. It is also a preferred embodiment that the cover composition used in the present invention, as the resin component, consists of the thermoplastic polyurethane (A) and the polyisocyanate mixture (B).

In the present invention, as the resin component of the cover composition, other resin components can be used in addition to the above thermoplastic polyurethane (A) and the polyisocyanate mixture (B), to the extent that the effects of the present invention is not deteriorated. Other resin components include, for example, an ionomer resin and a thermoplastic elastomer. Examples of the ionomer resin include one prepared by neutralizing at least a part of carboxyl groups in a copolymer composed of ethylene and $\alpha,\beta$-unsaturated carboxylic acid having 3 to 8 carbon atoms with a metal ion, one prepared by neutralizing at least a part of carboxyl groups in a ternary copolymer composed of ethylene, $\alpha,\beta$-unsaturated carboxylic acid having 3 to 8 carbon atoms, and $\alpha,\beta$-unsaturated carboxylic acid ester with a metal ion, or a mixture thereof. The specific examples of the ionomer resin include "Himilan available from MITSUI-DUPONT POLYCHEMICAL, "Surlyn" available from DUPONT CO., and "Iotek" available from ExxonMobil Corp. The specific examples of the thermoplastic elastomer include a thermoplastic polyamide elastomer having a commercial name of "PEBAX", for example, "PEBAX2533" available from ARKEMA Inc, a thermoplastic polyester elastomer having a commercial name of "HYTREL", for example, "HYTREL 3548", and "HYTREL 4047" available from DU PONT-TORAY Co. or "Primalloy" such as "Primalloy A 1500" manufactured by Mitsubishi Chemical Corporation, and a thermoplastic polystyrene elastomer having a commercial name of "Rabalon" available from Mitsubishi Chemical Co.

The cover composition used in the present invention may contain, other than the above-mentioned resin component, a pigment component such as titanium oxide and a blue pigment, a gravity adjusting agent such as calcium carbonate and barium sulfate, a dispersant, an antioxidant, an ultraviolet absorber, a light stabilizer, a fluorescent material or a fluorescent brightener to the extent that the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the thermoplastic polyurethane (A) constituting the cover. The white pigment in an amount of 0.5 part by mass or more can impart opacity to the cover, while the white pigment in an amount of more than 10 parts by mass may lower the durability of the resulting cover.

The cover composition of the present invention has a slab hardness of 60 or less in Shore D hardness. By making the cover composition have a slab hardness of 60 or less, the spin rate increases at the approach shot with a short iron and the like. As a result, the golf ball excellent in the controllability at the approach shot is obtained. In order to ensure the spin rate sufficiently enough at the approach shot, the cover composition preferably has a slab hardness of 50 or less, more preferably 40 or less, even more preferably 30 or less in Shore D hardness. The lower limit of the slab hardness of the cover composition is preferably, but not limited to, 15, more preferably 17, even more preferably 20. Herein, the slab hardness of the cover means the hardness when measuring the hardness of the cover composition which is formed into a sheet, and the measuring method is described later.

In the method for preparing the golf ball of the present invention, the thermoplastic polyurethane (A) and the polyisocyanate mixture (B) in which the urethane prepolymer (b-1) or the polyisocyanate (b-2) is dispersed in the thermoplastic resin (b-3) which does not substantially react with the isocyanate group are blended to obtain a cover composition. The blending of the cover composition is preferably carried out using, for example, a mixer capable of blending a raw material in the form of pellet, more preferably a tumbler type mixer. An embodiment of blending the cover composition include, for example, an embodiment of mixing an additive for the cover such as titanium oxide with the thermoplastic polyurethane (A) and subjecting the resultant mixture to extrusion to prepare a white pellet in advance, and then dry-blending the white pellet and the pellet of the polyisocyanate mixture (B); an embodiment of mixing the thermoplastic polyurethane (A), the polyisocyanate mixture (B) and the additive for a cover such as titanium oxide, and subjecting the resultant mixture to extrusion to prepare a white pellet in advance; and an embodiment of mixing the polyisocyanate mixture (B) and the additive for a cover such as titanium oxide and subjecting the resultant mixture to extrusion to prepare a white pellet in advance, and dry-blending the white pellet and a pellet of the thermoplastic polyurethane (A).

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). In the case that the cover composition is subjected to injection molding onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed. The crosslinking can be further promoted by post-curing the golf ball having the molded cover at the temperature of 40° C. or more for 4 hours to 96 hours.

In the present invention, use of the thermoplastic polyurethane (A) and the polyisocyanate mixture (B) suppresses the crosslinking reaction when molding the cover, and promotes the crosslinking reaction after molding the cover, thereby improving the abrasion-resistance of the cover without scarifying the productivity of the golf ball. The crosslinking of the cover can be confirmed by the following method.

The thermoplastic polyurethane (A) crosslinked with the polyisocyanate mixture (B) is insoluble in the solvent in which the linear thermoplastic polyurethane (A) is soluble. The solvent in which the linear thermoplastic polyurethane (A) is soluble includes, for example, N,N-dimethylformamide (DMF), tetrahydrofuran (THF) or the like. Namely, the thermoplastic polyurethane without being crosslinked is readily soluble in the solvent, but the thermoplastic polyurethane crosslinked with the polyisocyanate mixture (B) is insoluble in the solvent. According to this difference, it is possible to confirm whether the thermoplastic polyurethane is crosslinked or not.

Further, the thermoplastic polyurethane (A) crosslinked with the polyisocyanate mixture (B) has an allophanate bond or a biuret bond formed. These bonds are weaker than the urethane bond or the urea bond which constitute the main molecular chain of the thermoplastic polyurethane. Accordingly, the allophanate bond or a biuret bond forming the crosslinking structure can be broken by a treatment with a DMF solution of n-butylamine or a heat treatment.

The DMF solution of n-butyl amine preferably has a concentration of 0.01 mol/l to 0.25 mol/l, more preferably 0.05 mol/l. The heat treatment is preferably conducted at the temperature of 130° C. to 150° C. for about 2 hours to 4 hours.

In addition, it is possible to confirm what kind of the polyisocyanate mixture crosslinks the thermoplastic polyurethane, by analyzing the product which is treated with the DMF solution of n-butyl amine or treated with heat, using gel permeation chromatography (GPC), Fourier transform infrared spectrophotometer (FT-IR), nuclear magnetic resonance apparatus (NMR) or the like.

After the cover is molded, the mold is opened and the golf ball body is taken out from the mold, and as necessary, the golf ball body is preferably subjected to surface treatment such as deburring, cleaning, and sandblast. If desired, a paint film or a mark may be formed.

In the present invention, the thickness of the cover of the golf ball is preferably 0.8 mm or thinner. The core can be made to have a large diameter by making the cover thickness thin and thus the repulsion property of the golf ball can be improved. As a result, the flight distance can be made longer. In view of enlarging the core diameter, the thickness of the cover is more preferably 0.6 mm or thinner, even more preferably 0.5 mm or thinner, and even more preferably 0.4 mm or thinner. The lower limit of the thickness of the cover is, but not limited to, 0.1 mm. It is because if the cover thickness becomes thinner than 0.1 mm, molding of the cover becomes difficult in some cases. If the cover is made thin as described above, the load applied to the cover becomes high and the durability and abrasion resistance of the cover may be deteriorated and the spin rate is also lowered. However, in the golf ball of the present invention, since the thermoplastic polyurethane (A) is softened and crosslinked by the polyisocyanate mixture (B) to improve the cover strength and spin property, the cover can be made thin without decreasing the durability and the abrasion resistance.

When molding a cover, the concave portions called "dimple" are usually formed on the surface. FIG. 1 is an expanded sectional view of a part of a golf ball 2. This figure shows a cross-section which includes the deepest part De of a dimple 10 and the center of the golf ball 2. The up and down direction in FIG. 1 is the depth direction of the dimple 10. The depth direction is the direction from the gravity center of the area of the dimple 10 to the center of the golf ball 2. A chain double-dashed line 14 in FIG. 1 shows a virtual sphere. The surface of the virtual sphere 14 is the surface of the golf ball 2 in the case of assuming that there is no dimple 10. The dimple 10 is depressed in the virtual sphere 14. A land 12 corresponds to the virtual sphere 14.

Two headed arrow Di in FIG. 1 shows the diameter of the dimple 10. The diameter Di is the distance from one contact point Ed to another contact point Ed when a common tangent line T is drawn in both sides of the dimple 10. The contact points Ed are edges of the dimple 10. The edges Ed define the outline of the dimple 10. The diameter Di is preferably 2.0 mm or more and 6.0 mm or less. If the diameter Di is less than the above range, the dimple effect is hardly obtained and if the diameter Di exceeds 6.0 mm, the intrinsic property of the golf ball 2, that is, it is substantially spherical, is lost.

The area s of the dimple 10 is the area surrounded by the edge line in the case the center of the golf ball 2 is observed from infinity (that is, a plane area). The area s can be calculated according to a formula: $s=(Di/2)^2 \times \pi$. The ratio of the total of the area s of all the dimples 10 occupying the surface area of the virtual sphere 14 is called as an occupation ratio. The occupation ratio is preferably 75% or higher from a viewpoint that a sufficient dimple effect can be obtained.

The volume of the dimple means the volume of the portion surrounded with the curved plane including the outline of the dimple 10 and the virtual sphere 14. The total volume of the dimples 10 is preferably 250 mm$^3$ or more and 400 mm$^3$ or less. If the total volume is less than 250 mm$^3$, a hopping trajectory may be provided in some cases. If the total volume exceeds 400 mm$^3$, a dropping trajectory may possibly be provided.

In FIG. 1, the distance between the tangent line T and the deepest point De is the depth of the dimple 10. The depth is preferably 0.05 mm or more and 0.60 mm or less. If the depth is less than 0.05 mm, a hopping trajectory may be provided in some cases. On the other hand, if the depth exceeds 0.60 mm, a dropping trajectory may possibly be provided. The total number of the dimples 10 is preferably 200 or more and 500 or less. If the total number is less than 200, the dimple effect is hardly obtained. On the other hand, if the total number exceeds 500, the dimple effect is hardly obtained because the size of the respective dimples 10 is small.

Next, the core of the golf ball of the present invention will be explained. The core used for the golf ball of the present invention consists of the center and at least one intermediate layer covering the center, and has a hardness difference (Hs–Ho) between a surface hardness Hs and a center hardness Ho of from 15 to 50 in Shore D hardness.

The core of the golf ball of the present invention includes a two-piece core consisting of a center and a single-layered intermediate layer covering the center, a multi-layered core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degrees. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

In the present invention, the core has a hardness difference (Hs−Ho) between a surface hardness Hs and a center hardness Ho of from 15 to 50 in Shore D hardness. By making the core have the hard outer and soft inner structure, a launch angle is increased and an amount of spin is lowered at the shot with a driver, a long iron, and a middle iron. As a result, the golf ball having the long flight distance is obtained.

The hardness difference (Hs−Ho) between the surface hardness Hs and the center hardness Ho is preferably 15 or more, more preferably 17 or more, even more preferably 19 or more, and is preferably 50 or less, more preferably 45 or less, even more preferably 40 or less in Shore D hardness. If the hardness difference is more than 50, the intermediate layer does not follow the deformation of the core, and thus the durability may be lowered. On the other hand, if the hardness difference is less than 15, the degree of the hard outer and soft inner structure is too small, the high launch angle and low spin is not achieved sufficiently and thus the flight distance becomes short.

The center hardness Ho of the core is preferably 25 or more, more preferably 28 or more, even more preferably 30 or more in Shore D hardness. If the center hardness Ho of the core is less than 25 in Shore D hardness, the golf ball tends to become so soft that the resilience will be lowered. On the other hand, the center hardness Ho of the core is preferably 55 or less, more preferably 52 or less, even more preferably 50 or less in shore D hardness. If the center hardness Ho is more than 55 in Shore D hardness, the golf ball becomes so hard that the shot feeling may be lowered. In the present invention, the center hardness Ho of the core means the hardness obtained by measuring the central point of the cut surface of the core cut into halves with the Shore D type spring hardness tester.

The surface hardness Hs of the core is preferably 40 or more, more preferably 43 or more, even more preferably 45 or more in Shore D hardness. If the surface hardness Hs is less than 40 in Shore D hardness, the golf ball may become too soft, resulting in lowering of resilience. On the other hand, the surface hardness Hs of the core is preferably 75 or less, more preferably 73 or less, even more preferably 71 or less in Shore D hardness. If the surface hardness Hs is larger than 75 in Shore D hardness, the golf ball may become too hard, resulting in lowering of the shot feeling.

The diameter of the core of the golf ball of the present invention is preferably 39 mm or more, more preferably 39.5 mm or more, even more preferably 40 mm or more. If the diameter of the core is less than 39 mm, the thickness of the cover becomes too thick, so that the resilience is lowered. The upper limit of the diameter of the core is not particularly limited, but it is preferably 42.6 mm, more preferably 42.5 mm, even more preferably 42.4 mm. If the diameter of the core is more than 42.6 mm, the cover becomes relatively too thin, so that the protection effects of the cover cannot be sufficiently obtained.

As the center of the golf ball of the present invention, a conventionally known rubber composition (hereinafter simply referred to as "center rubber composition" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber such as a polybutadiene rubber, a natural rubber, a polyisoprene rubber, a styrene polybutadiene rubber, and ethylene-propylene-diene terpolymer (EPDM) may be used. Among them, typically preferred is the high cis-polybutadiene having cis-1,4 bond in a proportion of 40% or more, more preferably 70% or more, even more preferably 90% or more in view of its superior repulsion property.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and preferably 5 parts by mass or less, more preferably 3 parts by mass or less based on 100 parts by mass of the base rubber. If the amount is less than 0.3 part by mass, the core becomes too soft, and the resilience tends to be lowered, and if the amount is more than 5 parts by mass, the core becomes too hard, and the shot feeling may be lowered.

As the co-crosslinking agent, for example, $\alpha,\beta$-unsaturated carboxylic acid having 3 to 8 carbon atoms or a metal salt thereof can be used. As the metal constituting the metal salt, for example, zinc, magnesium, calcium, aluminum and sodium may be used, and among them, zinc is preferred because it provides high resilience. Preferable example of $\alpha,\beta$-unsaturated carboxylic acid having 3 to 8 carbon atoms or a metal salt thereof are acrylic acid, methacrylic acid, zinc acrylate, and zinc methacrylate.

The amount of the co-crosslinking agent to be used is preferably 10 parts or more, more preferably 15 parts or more, eve more preferably 20 parts or more, and is preferably 55 parts or less, more preferably 50 parts or less, even more preferably 48 parts or less based on 100 parts of the base rubber by mass. If the amount of the co-crosslinking agent to be used is less than 10 parts by mass, the amount of the organic peroxide must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler includes one which is conventionally blended in the rubber composition for the center of the golf ball, for example, an inorganic salt (specifically, zinc oxide, barium sulfate, calcium carbonate) and a high gravity metal powder (for example, tungsten powder, molybdenum powder) and a mixture of them. The filler is appropriately blended in order to adjust the specific gravity of the golf ball obtained as the final product in the range of 1.0 to 1.5. The amount of the filler to be blended in the rubber composition is preferably 0.5 part or more, more preferably 1 part or more, and preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl)disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

It is a preferred embodiment that the center having a surface hardness Hs1 larger than the center hardness Ho1 is used. The hardness difference (Hs1−Ho) between the surface hardness Hs1 and the center hardness Ho in Shore D hardness is preferably 10 or higher, more preferably 14 or higher, and is preferably 30 or lower, and more preferably 26 or lower. If the hardness difference is more than 30, the durability is lowered and if the hardness difference is lower than 10, the high launch angle and the low spin rate may be insufficient, and thus the flight distance becomes short. The hardness difference of the center can be provided by properly selecting the heat molding conditions of the center.

The surface hardness Hs1 of the center is preferably 45 or more, more preferably 48 or more, even more preferably 51 or more, and is preferably 65 or less, more preferably 63 or less, even more preferably 61 or less, in Shore D hardness. If the surface hardness Hs1 of the center is less than 45 in Shore D hardness, the center may possibly become so soft as to lower the repulsion property in some cases. As a result, the flight distance may be shortened. On the other hand, if the surface hardness Hs1 of the center exceeds 65 in Shore D hardness, the center may possibly become too hard and the shot feeling tends to be deteriorated in some cases.

The center hardness Ho of the center is preferably 25 or more, more preferably 28 or more, even more preferably 30 or more, and is preferably 55 or less, more preferably 52 or less, and even more preferably 50 or less in Shore D hardness. If the center hardness Ho of the center is less than 25, the center may possibly become so soft as to lower the durability in some cases. If the center hardness Ho of the center exceeds 55, the core may possibly become too hard and the shot feeling tends to be worsened.

If the core of the golf ball of the present invention is a two-piece core consisting of the center and a single intermediate layer covering the center, the diameter of the center is preferably 37 mm or larger, more preferably 38 mm or larger, and is preferably 42 mm or smaller, and more preferably 41 mm or smaller. If the diameter of the center is smaller than 37 mm, the intermediate layer or the cover layer has to be made thicker than the desired thickness, and as a result the repulsion property may be decreased in some cases. On the other hand, if the diameter of the center exceeds 42 mm, the intermediate layer or the cover layer has to be made thinner than the desired thickness, and as a result the function of the intermediate layer or the cover layer cannot be exhibited sufficiently.

In the case the diameter of the center for the two-piece core is from 37 mm to 42 mm, the center preferably has a compression deformation amount (the shrinking amount of the center along the compression direction) of 2.2 mm or higher, more preferably 2.4 mm or higher, and preferably has a compression deformation amount of 4.0 mm or lower and more preferably 3.8 mm or lower when applying a load from 98 N as an initial load to 1275 N as a final load. If the compression deformation amount is lower than 2.2 mm, the shot feeling becomes poor due to the hardness and if it exceeds 4.0 mm, the repulsion property may possibly be lowered in some cases.

If the core of the golf ball of the present invention is a multi layered core consisting of the center and multi-piece or multi layer of intermediate layers covering the center, the diameter of the center is preferably 35 mm or larger, more preferably 36 mm or larger, and is preferably 41 mm or smaller, more preferably 40 mm or smaller. If the diameter of the center is smaller than 35 mm, the intermediate layer or the cover layer have to be made thicker than the desired thickness and as a result, the repulsion property may be decreased in some cases. On the other hand, if the diameter of the center exceeds 41 mm, the intermediate layer or the cover layer has to be made thinner than the desired thickness, and as a result the intermediate layer or the cover layer does not function sufficiently.

In the case the diameter of the center for a multi-layered core is from 35 mm to 41 mm, the center preferably has a compression deformation amount (the shrinking amount of the center along the compression direction) of 2.4 mm or higher, more preferably 2.6 mm or higher, and preferably has a compression deformation amount of 4.6 mm or lower, more preferably 4.4 mm or lower when applying a load from 98 N as an initial load to 1275 N as a final load. If the compression deformation amount is lower than 2.4 mm, the shot feeling becomes poor and if it exceeds 4.6 mm, the repulsion property may possibly be lowered in some cases.

The intermediate layer includes, for example, a thermoplastic resin such as a polyurethane resin, an ionomer resin, nylon, and polyethylene; and a thermoplastic elastomer such as a polystyrene elastomer, a polyolefin elastomer, a polyurethane elastomer, and a polyester elastomer; and a rubber composition such as the center rubber composition. The thermoplastic resins and the thermoplastic elastomers may be used alone or as a mixture of two or more of them. Among them, an ionomer resin is particularly preferable since it easily increases the hardness of the intermediate layer and gives a hard-outer soft-inner core structure.

In the case that the intermediate layer contains an ionomer resin, the content ratio of the ionomer resin in the resin component constituting the intermediate layer is preferably 80 mass % or more, more preferably 85 mass % or more, and even more preferably 90 mass % or more. In a preferable embodiment, the resin component of the intermediate layer substantially consists of the ionomer resin.

The intermediate layer of the golf ball of the present invention may contain a reinforcing material, titanium oxide, a pigment component such as a blue color pigment, a specific gravity adjustment agent such as calcium carbonate and barium sulfate, a dispersant, an anti-oxidant, a ultraviolet absorbent, a light stabilizer, a fluorescent material, a fluorescent brightener, and the like, besides the resin component or the rubber composition, to an extent that the desired properties are not deteriorated. Examples of the reinforcing material include needle-like or Tetrapod (registered trademark)-shaped zinc oxide; a fibrous aluminum borate whisker; a short fiber such as a glass fiber, a carbon fiber, an aramid fiber, or a metal fiber; a nano-filler such as hydrotalcite, octosilicate, and the like.

The intermediate layer is formed, for example, by covering the center with the intermediate layer composition. An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding for 1 to 5 minutes at the temperature of 130° C. to 170° C.

In the case that the intermediate layer composition contains the rubber composition as a main component (50 mass % or more), the thickness of the intermediate layer formed from the intermediate layer composition is preferably 1.2 mm or more, more preferably 1.8 mm or more, even more preferably 2.4 mm or more and is preferably 6.0 mm or less, more preferably 5.2 mm or less, and even more preferably 4.4 mm or less.

In the case that the intermediate layer composition contains the resin as a main component (50 mass % or more), the thickness of the intermediate layer formed from the intermediate layer composition is preferably be 0.5 mm or more, preferably 0.6 mm or more, more preferably 0.7 mm or more and is preferably 1.8 mm or less, more preferably 1.7 mm or less, and even more preferably 1.6 mm or less. If the thickness of the intermediate layer exceeds 1.8 mm, the repulsion property of the resultant golf ball may possibly be lowered. If it is less than 0.5 mm, an excess of the spin rate may not be suppressed at the driver shot in some cases.

The intermediate layer of the golf ball of the present invention preferably has a slab hardness of 55 or more, more preferably 58 or more, even more preferably 61 or more, and preferably has a slab hardness of 78 or less, more preferably 76 or less, even more preferably 74 or less in Shore D hardness. By making the slab hardness of the intermediate layer 55 or more in Shore D hardness, the core can be designed to have a hard outer and soft inner structure. As a result, a long flight distance can be achieved by high launch angle and low spin rate. If the slab hardness of the intermediate layer is not more than 78 in Shore D hardness, the excellent shot feeling can be obtained. Further, the controllability can be enhanced by the improved spin rate. Herein, the slab hardness of the intermediate layer means a hardness when measuring the hardness of the intermediate layer composition which is formed into a sheet, and the measuring method is described later. In addition, the slab hardness of the intermediate layer can be appropriately adjusted by the selection of the above mentioned resin component or the rubber composition, and the amount of the additives.

The golf ball of the present invention is not particularly limited, as long as it has a core consisting of a center and at least one intermediate layer covering the center and a cover covering the core. As the structure of the golf ball of the present invention, it may be a three-piece golf ball having a core consisting of a center and a single intermediate layer covering the center, and the cover covering the core; a four-piece golf ball having a core consisting of a center and two intermediate layers covering the center, and the cover covering the core; a multi-piece golf ball having a core consisting of a center and multi-piece or multi-layered intermediate layers covering the center, and a cover covering the core. Among them, the present invention can be preferably applied to the three-piece golf ball having a core consisting of a center and a single layered intermediate layer covering the center, and a cover covering the core.

The golf ball of the present invention preferably has a PGA compression of 80 or higher, more preferably 85 or higher, even more preferably 90 or higher and preferably has a PGA compression of 120 or lower, more preferably 115 or lower, and even more preferably 110 or lower. If the PGA compression is less than 80, the repulsion property is lowered. Further, the golf ball becomes too soft and the shot feeling becomes heavy. On the other hand, if the PGA compression exceeds 120, the golf ball becomes too hard, and the shot feeling becomes poor. The PGA compression is a load necessary to give certain flexure (about 2.5 mm) to the ball. For example, a PGA compression of 80 means that the necessary load is 80 kg and as the numeral value is higher, the ball is harder.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]
(1) Slab Hardness (Shore D Hardness)

Using the cover composition or the intermediate layer composition, a sheet having a thickness of about 2 mm were prepared by hot press molding and preserved at the temperature of 23° C. for two weeks. Three or more of the sheets were stacked on one another to avoid being affected by the measuring substrate on which the sheets were placed, and the stack was subjected to the measurement using P1 type auto hardness tester provided with the Shore D type spring hardness tester prescribed by ASTM-D2240, available from KOUBUNSHI KEIKI CO., LTD to obtain the respective slab hardness of the cover composition and the intermediate layer. The heat press molding condition was at 120° C. for 5 minutes and thereafter at 170° C. for 17 minutes for the intermediate layer composition 4, and at 160° C. for 3 minutes for other intermediate layer compositions than the intermediate layer composition 4.

(2) Center Hardness, Core Hardness (Shore D Hardness)

Using P1-type automatic rubber hardness tester equipped with the Shore D type spring hardness tester specified by ASTM-D2240 manufactured by Kobunshi Keiki Co., Ltd., the shore D hardness measured at a surface part of a core or a center was determined as the surface hardness Hs of the core or the surface hardness Hs1 of the center, and the shore D hardness obtained by cutting a spherical core or center into halves and measuring at a center of the cut surface was determined as the center hardness Ho of the core or the center.

(3) PGA Compression

Measurement was carried out using a compression measurement apparatus manufactured by OMI WEIGHING MACHINE INC.

(4) Driver Shot

A W#1 driver with a metal head (manufactured by SRI Sports Ltd, SRIXON W505, S shaft, loft 8.5°) was attached to a swing robot M/C manufactured by Golf Laboratories, Inc. and respective golf balls were hit at the head speed of 50 m/second to measure the speed (m/s) and spin rate (rpm) right after hitting, and the flight distance (distance (m) from the launching point to the stop point). The measurement was carried out 10 times for each golf ball and the average value was defined as the flight distance. The speed and the spin rate of the golf ball right after the hitting were measured by continuously taking photographs of the hit golf ball.

(5) Long Iron Shot

A I#5 iron (SRIXON I-505, manufactured by SRI Sports) was attached to a swing robot M/C manufactured by Golf Laboratory. Each golf ball was hit with the iron at the head speed of 41 m/second, and the speed (m/s) and the spin rate (rpm) right after hitting the golf ball as well as the flight distance (the distance (m) from the launching point to the stop point) were measured. The measurement was carried out 10 times for each golf ball and the average value was defined as the flight distance of the golf ball. The speed and the spin rate of the golf ball right after the hitting were measured by continuously taking photographs of the hit golf ball.

(6) Approach Wedge Shot

An approach wedge (SRIXON I-302, manufactured by SRI Sports) was attached to a swing robot M/C manufactured by Golf Laboratory and when each golf ball was hit at the head speed of 21 m/second, the spin rate (rpm) was measured by continuously taking photographs of the shot golf ball. The measurement was carried out 10 times for each golf ball and the average value was defined as the spin rate. The spin stability is defined as the difference in the spin rate between the maximum value and the minimum value of the spin rate measured 10 times and as the range of the spin rate is narrower, the spin stability is higher.

Evaluation Standard of Spin Stability

E: The range was less than 100 rpm

G: The range was not less than 100 rpm and less than 200 rpm

P: The range was not less than 200 rpm (7) Abrasion-Resistance

A sand wedge (manufactured by SRI sports, Ltd, S shaft) was installed on a swing robot M/C available from Golf Laboratories, Inc., and two points of a ball respectively were hit once at the head speed of 36 m/sec. to observe the areas which were hit. Abrasion-resistance was evaluated and ranked into four levels based on following criteria.

E (Excellent): Almost no scratch was present on the surface of the golf ball.

G (Good): Slight scratches were present on the surface of the golf ball, but were not conspicuous.

F (Fair): Scratches were conspicuous, and scuffing could be observed.

P (Poor): The surface of the golf ball was abraded considerably, and scuffing was conspicuous.

(8) Durability

Each golf ball was repeatedly hit with a metal head driver (manufactured by SRI Sports Ltd, XXIO, S shaft, loft 11°) attached to a swing robot M/C manufactured by Golf Laboratories, at the head speed of 45 m/sec. to make the golf ball collide with a collision board. Times up to which the golf balls are cracked were measured. In addition, each value obtained was reduced to an index number relative to the measured value obtained in Golf ball No. 15 being assumed 100. The larger number indicates better durability.

[Preparation of Polyisocyanate Mixture (B)]

A predetermined amount of the polyisocyanate and the polyol shown in Table 1 were used to carry out a reaction at 80° C. for 2 hours under a dried nitrogen atmosphere, thereby obtaining an isocyanate group-terminated urethane prepolymer (b-1). Next, as the thermoplastic resin which does not substantially react with an isocyanate group, one obtained by drying to dehydrate in advance a thermoplastic polyester elastomer ("HYTREL 3046" manufactured by DU PONT-TORAY Co,) (b-3) was prepared.

The above mentioned isocyanate group-terminated urethane prepolymer (b-1) and the thermoplastic polyester elastomer (b-3) were blended in a proportion of 1:2 by mass ratio, and polyisocyanates (diisocyanate, or the polyisocyanate having at least three isocyanate groups (b-2)) and the thermoplastic polyester elastomer (b-3) were blended in a mass ratio as shown in table 1 to obtain mixtures, respectively. The mixtures were kneaded in a mixing roll at the temperature of 120° C. to 180° C. for 5 to 10 minutes. The resultant mixture was discharged and pulverized, thereby obtaining a pellet of the polyisocyanate mixture (B).

TABLE 1

| | Raw Material | | Num. Average molecular weight | Polyisocyanate mixture (B) | | | | | | L.M. Polyisocyanate mixture | | |
|---|---|---|---|---|---|---|---|---|---|---|---|---|
| | | | | 1 | 2 | 3 | 4 | 5 | 6 | 1 | 2 | 3 |
| Urethane prepolymer (b-1) | Poly isocyanate | MDI | 250 | 250 | 250 | — | — | — | — | 250 | — | 250 |
| | | H$_{12}$MDI | 262 | — | — | 262 | 262 | — | — | — | 262 | — |
| | Polyol | PTMG1000 | 1000 | 750 | — | 750 | — | — | — | — | — | — |
| | | PTMG2000 | 2000 | — | 1500 | — | 1500 | — | — | — | — | — |

TABLE 1-continued

|  | Raw Material | Num. Average molecular weight | Polyisocyanate mixture (B) | | | | | | L.M. Polyisocyanate mixture | | |
|---|---|---|---|---|---|---|---|---|---|---|---|
|  |  |  | 1 | 2 | 3 | 4 | 5 | 6 | 1 | 2 | 3 |
| Polyisocyanate (b-2) | Takenate D-170N | 504.6 | — | — | — | — | 504.6 | — | — | — | — |
|  | Tkenate D-127N | 666.9 | — | — | — | — | — | 666.9*) | — | — | — |
|  | Thermoplastic polyester(b-3) | HYTREL 3046 | — | 2000 | 3500 | 2024 | 3524 | 750 | 750 | 500 | 500 | 750 |
| NCO content (NCO %) of Urethane prepolymer (b-1) | | | 2.1 | 1.2 | 2.1 | 1.2 | — | — | — | — | — |
| NCO content (NCO %) of polyisocyanate (b-2) | | | — | — | — | — | 25.0 | 18.9 | — | — | — |
| NCO content (NCO %) of Polyisocyanate mixture (B) | | | 0.7 | 0.4 | 0.7 | 0.4 | 10.8 | 8.9 | 11.2 | 11.0 | 8.4 |

Formulation: g
*)The amount of TAKENATE D-127N was 666.9 g based on the non-volatile components.
Notes on Table 1
L.M. polyisocyanate mixture: Low molecular weight polyisocyanate mixture
MDI: 4,4'-diphenylmethane diisocyanate manufactured by Tokyo Chemical Industry Co., Ltd.
$H_{12}MDI$: 4,4'-dicyclohexylmethane diisocyanate manufactured by Tokyo Chemical Industry Co., Ltd.
PTMG1000: polyoxytetramethylene glycol, having a number average molecular weight of 1000 manufactured by Mitsubishi Chemical Co.
PTMG2000: polyoxytetramethylene glycol having a number average molecular weight of 2000 manufactured by Mitsubishi Chemical Co.
TAKENATE D-170N: HDI isocyanurate (trimer) manufactured by Mitsui Chemicals Polyurethanes, Inc.; MW = 504.6
TAKENATE D-127N: $H_6XDI$ isocyanurate (trimer) manufactured by Mitsui Chemicals Polyurethanes, Inc.; MW = 666.9

[Preparation of Golf Ball]
(1) Preparation of Core

The rubber composition shown in Table 2 was kneaded and pressed with upper and lower molds each having a spherical cavity at the heating condition of 170° C. for 17 minutes to obtain the center in a spherical shape.

TABLE 2

| Center composition | | 1 | 2 | 3 |
|---|---|---|---|---|
| Formulation | Polybutadiene Rubber | 100 | 100 | 100 |
|  | Zinc acrylate | 38 | 35 | 14 |
|  | Zinc oxide | 5 | 5 | 5 |
|  | Barium sulfate | Proper amount*) | Proper amount*) | Proper amount*) |
|  | Diphenyl disulfide | 0.5 | 0.5 | 0.5 |
|  | Dicumyl peroxide | 0.8 | 0.8 | 0.8 |

Notes on Table 2
Formulation: mass part
*)Adjusted to give golf ball weight of 45.4 g depending on the cover composition and the intermediate layer composition.
Polybutadiene rubber: BR730 (high cis-polybutadiene) manufactured by JSR Corporation
Zinc acrylate: ZNDA-90S manufactured by NIHON JYORYU KOGYO Co,. LTD.
Zinc oxide: Ginrei R manufactured by Toho-Zinc Co.
Barium sulfate: Barium sulfate BD manufactured by Sakai Chemical Industry Co. Ltd.
Dicumyl peroxide: Percumyl D manufactured by NOF Corporation
Diphenyl disulfide: manufactured by Sumitomo Seika Chemicals Company Limited (2) Preparation of the Intermediate Layer Composition With respect to the intermediate layer compositions 1 to 3, the materials shown in Table 3 were mixed using a twin-screw kneading extruder to obtain the intermediate layer composition in the form of pellet. The extrusion was conducted in the following conditions: screw diameter=45 mm, screw revolutions=200 rpm, screw L/D=35, and the intermediate layer composition was heated to from 160° C. to 230° C. at the die position of the extruder.

TABLE 3

| | | Intermediate layer composition No. | | | |
|---|---|---|---|---|---|
| | | 1 | 2 | 3 | 4 |
| Formulation | Himilan 1605 | 50 | — | — | — |
|  | Himilan AM7329 | 50 | — | — | — |
|  | Surlyn 8140 | — | 50 | — | — |
|  | Surlyn 9120 | — | 50 | — | — |
|  | Himilan 1855 | — | — | 45 | — |
|  | Himilan 1555 | — | — | 35 | — |
|  | Rabalon T3339C | — | — | 20 | — |
|  | Titanium dioxide | 4 | 4 | 4 | — |
|  | Polybutadiene | — | — | — | 100 |
|  | Zinc acrylate | — | — | — | 43 |
|  | Zinc oxide | — | — | — | 5 |
|  | Barium Sulfate | — | — | — | 5 |
|  | Diphenyl disulfide | — | — | — | 0.5 |
|  | Dicumyl peroxide | — | — | — | 0.8 |
| Slab hardness (Shore D) | | 64 | 68 | 48 | 55 |

Note on table 3
Formulation: mass part
Himilan 1605: sodium ion-neutralized ethylene-methacrylic acid copolymerized ionomer resin manufactured by MITSUI-DUPONT POLYCHEMICAL CO., LTD.
Himilan AM7329: zinc ion-neutralized ethylene-methacrylic acid copolymerized ionomer resin manufactured by MITSUI-DUPONT POLYCHEMICAL CO., LTD.
Surlyn 8140: sodium ion-neutralized ethylene-methacrylic acid copolymerized ionomer resin manufactured by DUPONT CO.
Surlyn 9120: zinc ion-neutralized ethylene-methacrylic acid copolymerized ionomer resin manufactured by DUPONT CO.
Himilan 1855: zinc ion-neutralized ethylene-methacrylic acid copolymerized ionomer resin manufactured by MITSUI-DUPONT POLYCHEMICAL CO., LTD.
Himilan 1555: sodium ion-neutralized ethylene-methacrylic acid copolymerized ionomer resin manufactured by MITSUI-DUPONT POLYCHEMICAL CO., LTD.
Rabalon T3339C: polystyrene elastomer manufactured by Mitsui Chemicals, Inc.
Polybutadiene rubber: BR730 (high cis-polybutadiene) manufactured by JSR Corporation
Zinc acrylate: ZNDA-90S manufactured by NIHON JYORYU KOGYO Co,. LTD.
Zinc oxide: Ginrei R manufactured by Toho-Zinc Co.
Barium sulfate: barium sulfate BD manufactured by Sakai Chemical Industry Co. Ltd.
Dicumyl peroxide: Percumyl D manufactured by NOF Corporation
Diphenyl disulfide: manufactured by Sumitomo Seika Chemicals Company Limited (3) Preparation of the Cover Composition and Golf Ball Body Thermoplastic polyurethane (A) (Elastollan XNY97A, XNY75A, ET880 available from BASF Japan Ltd.) in the form of a pellet, polyisocyanate mixture (B) in the form of a pellet, and an additive for cover (titanium oxide) shown in Tables 6 and 7 were dry-blended using a tumbler type mixer to prepare a cover composition. The blending ratio of the polyisocyanate mixture (B) to the thermoplastic polyurethane (A) was adjusted to have an almost same NCO content with respect to 100 mass parts of the thermoplastic polyurethane (A).

TABLE 4

| | | Core No. | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Center | Composition No. | 1 | 2 | 1 | 2 | 1 | 2 | 1 | 1 | 2 | 2 | 3 | 1 | 2 | 1 | 1 |
| | Diameter (mm) | 39.5 | 39.3 | 39.7 | 39.5 | 38.9 | 39.1 | 40.5 | 34.3 | 34.7 | 33.5 | 20.3 | 37.3 | 37.3 | 39.7 | 37.5 |
| | Surface hardness Hs 1 (Shore D) | 59 | 56 | 59 | 56 | 58 | 56 | 59 | 53 | 53 | 53 | 42 | 58 | 55 | 59 | 58 |
| | Compression Deformation amount (mm) | 2.7 | 3.1 | 2.7 | 3.1 | 2.8 | 3.1 | 2.7 | 3.3 | 3.3 | 3.3 | 5.9 | 2.8 | 3.2 | 2.7 | 2.8 |
| | Intermediate layer | — | — | — | — | — | — | — | — | — | — | — | — | — | — | — |
| Inner | Composition No. | 1 | 1 | 2 | 2 | 1 | 2 | 2 | 1 | 4 | 4 | 4 | 3 | 1 | 3 | 3 |
| | Thickness (mm) | 0.8 | 1.6 | 1.1 | 1.3 | 1.8 | 1.3 | 0.8 | 1.6 | 3.8 | 3.8 | 9.8 | 2.0 | 1.5 | 1.0 | 1.6 |
| Outer | Composition No. | — | — | — | — | — | — | — | 2 | — | — | 2 | — | — | — | — |
| | Thickness (mm) | — | — | — | — | — | — | — | 1.1 | — | — | 1.1 | — | — | — | — |
| Core Center hardness Ho | | 41 | 38 | 41 | 38 | 40 | 38 | 41 | 34 | 34 | 34 | 29 | 40 | 37 | 41 | 40 |
| Core Surface hardness Hs | | 65 | 65 | 69 | 69 | 65 | 69 | 69 | 70 | 59 | 59 | 70 | 52 | 65 | 52 | 52 |
| Core Hardness difference (Hs − Ho) | | 24 | 27 | 28 | 31 | 25 | 31 | 28 | 36 | 25 | 25 | 41 | 12 | 28 | 11 | 12 |

Hardness: Shore D hardness (4) Production of Golf Ball Main Body

Each core was produced by forming an intermediate layer on the above obtained center using the intermediate layer composition. In the case of using the intermediate layer compositions 1 to 3, the intermediate layer was formed by directly injection molding on the center. In the case of using the intermediate layer composition 4, first the intermediate layer composition shown in Table 3 was kneaded and the upper die for molding a center in the state that the center was set in and a lower die for molding a core were clamped in a manner that a necessary amount of the intermediate layer composition was brought into contact with a half of the surface of the center and heat pressing was carried out to produce an intermediate core molded product having an intermediate layer formed on a half of the surface of the center. Next, the lower die for molding the core in the state that the intermediate layer of the intermediate core molded product was housed and an upper die for molding a core were clamped in a manner that a necessary amount of the intermediate layer composition was brought into contact with the other half of the surface of the center and heat pressing was carried out to produce a core having an intermediate layer on the other half of the surface of the center. The structures of the obtained core were shown in Table 4.

(4-1) Injection-Molding

The resultant cover composition was injection-molded onto the core thus obtained to form the cover. The upper and lower molds for forming the cover have a spherical cavity with pimples. The part of the pimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

(4-2) Compression-Molding

Molding of half shells were performed by charging a pellet of the cover composition thus obtained into each of the depressed part of the lower mold for molding half shells, and applying pressure to mold half shells. Compression molding was conducted at the temperature of 170° C. for 5 minutes under the molding pressure of 2.94 MPa. The center obtained above was covered with two half shells in a concentric manner and the cover was molded by compression molding. Compression molding was performed at the temperature of 150° C. for 3 minutes under the molding pressure of 9.8 MPa to obtain a golf ball body.

The surface of the obtained golf ball body was subjected to sandblast treatment and marking followed by coating a clear paint, drying at the temperature of 40° C. for 4 hours in an oven to dry the paint to obtain a golf ball having a diameter of 42.7 mm and a weight of 45.6 g.

Figure 2:
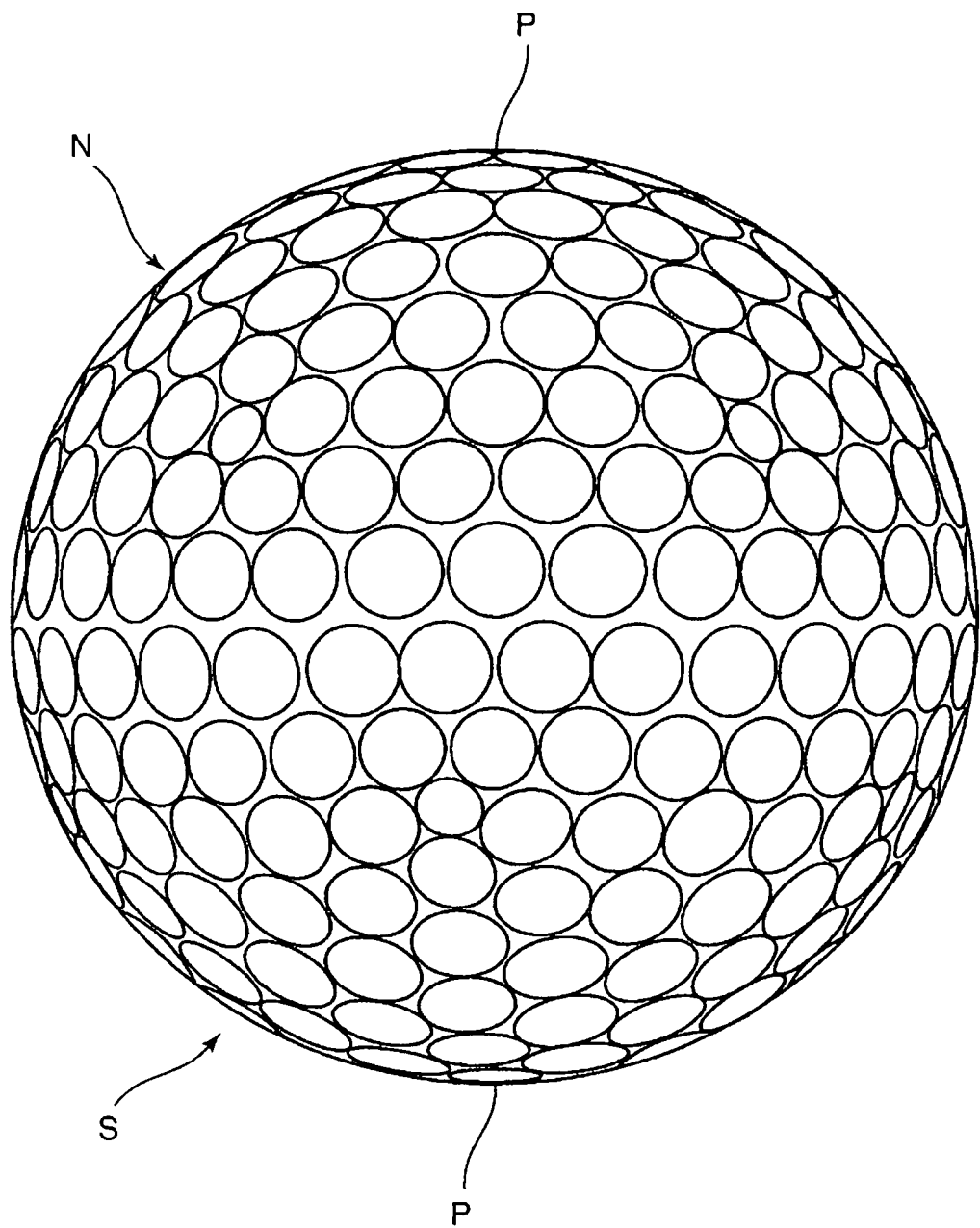
FIG. 2 is a front view of dimple patterns formed on a surface of a golf ball.
Figure 3:
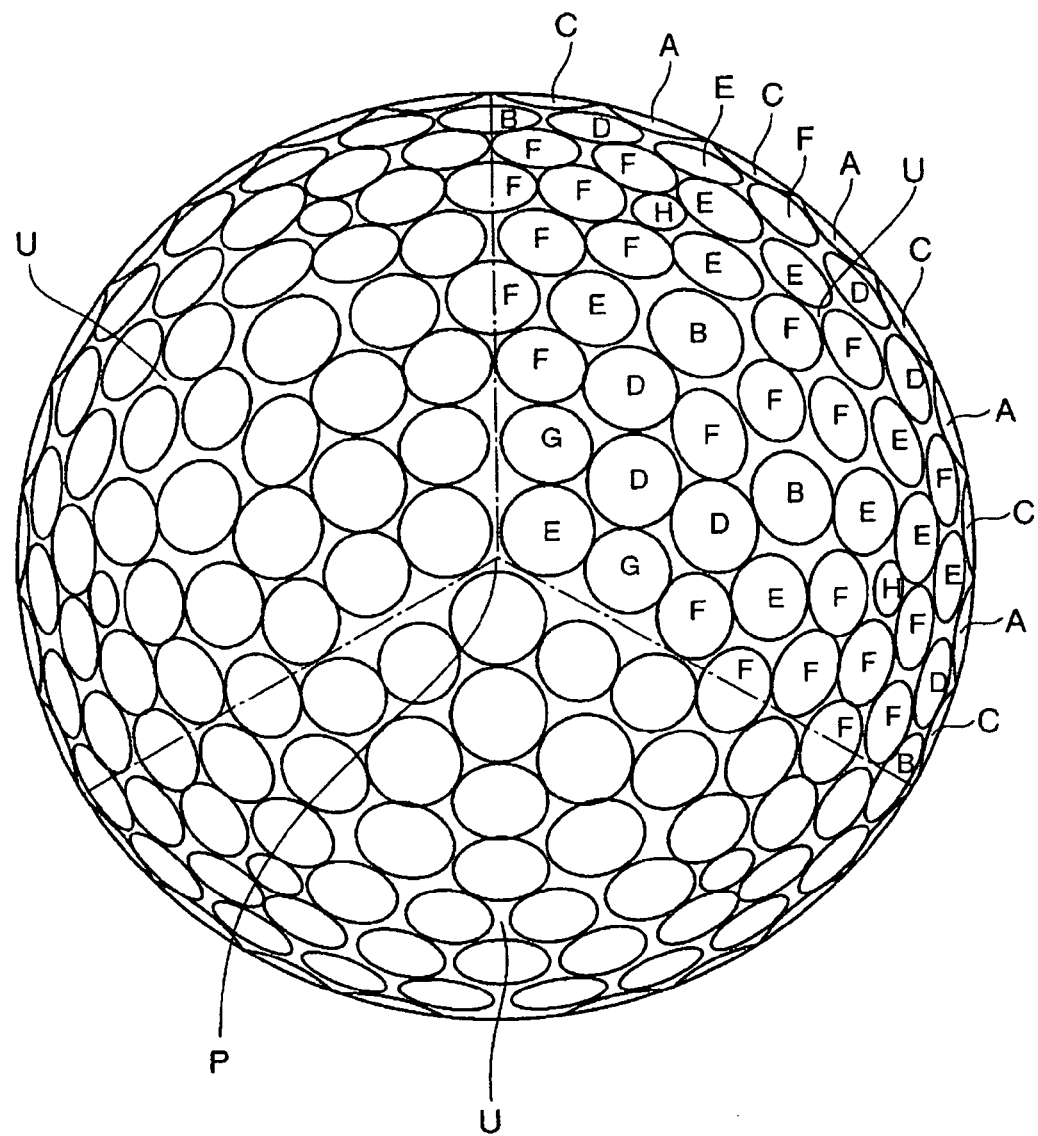
FIG. 3 is a plane view of dimple patterns formed on a surface of a golf ball.

The dimple pattern shown in Table 5, FIG. 2 and FIG. 3 were formed on the surface of the golf ball. In the north hemisphere N and south hemisphere S of the golf ball, there is a unit U which has rotational symmetries through 120 degrees. In each of the north hemisphere N and the south hemisphere S, there are three units U. FIG. 3 shows kinds of dimples by represented symbols A to H in one unit U. In FIGS. 2 and 3, P means pole.

TABLE 5

| Kinds | Number | Diameter (mm) | Depth (mm) | Curvature radius (mm) | Volume (mm³) |
|---|---|---|---|---|---|
| A | 24 | 4.75 | 0.140 | 20.22 | 1.242 |
| B | 18 | 4.65 | 0.140 | 19.38 | 1.190 |
| C | 30 | 4.55 | 0.135 | 19.24 | 1.099 |
| D | 42 | 4.45 | 0.135 | 18.40 | 1.051 |
| E | 66 | 4.25 | 0.135 | 16.79 | 0.959 |
| F | 126 | 4.05 | 0.130 | 15.84 | 0.839 |
| G | 12 | 3.95 | 0.130 | 15.07 | 0.798 |
| H | 12 | 2.80 | 0.120 | 8.23 | 0.370 |

The obtained golf ball was evaluated in terms of the flight distance, spin rate, and abrasion-resistance. The results as well as the structure of the golf ball are shown in Tables 6 and 7.

TABLE 6-1

| | | Golf ball | | | | | |
|---|---|---|---|---|---|---|---|
| | | 1 | 2 | 3 | 4 | 5 | 6 |
| Core | Structure | 3P | 3P | 3P | 3P | 3P | 3P |
| | Core No. | 1 | 2 | 3 | 4 | 5 | 6 |
| | Hardness difference (Hs − Ho) | 24 | 27 | 28 | 31 | 25 | 31 |
| Cover | Thermoplastic polyurethane (A) | — | — | — | — | — | — |
| | Elastollan XNY90A | 100 | — | — | — | 100 | 100 |
| | Elastollan XNY75A | — | 100 | — | 100 | — | — |
| | Elastollan ET880 | — | — | 100 | — | — | — |
| | Polyisocyanate mixture (B) | — | — | — | — | — | — |
| | 1 [NCO % = 0.7] | 20 | — | — | — | — | — |
| | 2 [NCO % = 0.4] | — | 35 | — | — | — | — |
| | 3 [NCO % = 0.7] | — | — | 20 | — | — | — |
| | 4 [NCO % = 0.4] | — | — | — | 35 | — | — |
| | 5 [NCO % = 10.0] | — | — | — | — | 1.4 | — |
| | 6 [NCO % = 8.9] | — | — | — | — | — | 1.6 |
| | Filler (Titanium oxide) | 4 | 4 | 4 | 4 | 4 | 4 |
| | Thickness (mm) | 0.8 | 0.1 | 0.4 | 0.3 | 0.1 | 0.5 |
| | Slab hardness (Shore D) | 38 | 20 | 26 | 20 | 38 | 38 |
| | Molding method | Inj. | Comp. | Inj. | Inj. | Inj. | Comp. |
| Golf Ball | Surface hardness (Shore D) | 64 | 65 | 68 | 68 | 64 | 68 |
| | PGA compression | 102 | 97 | 106 | 98 | 110 | 98 |
| Driver Shot | Ball Speed (m/s) | 76.8 | 76.6 | 77.0 | 76.6 | 77.2 | 76.6 |
| | Spin rate (rpm) | 2500 | 2300 | 2380 | 2200 | 2450 | 2200 |
| | Flight distance (m) | 266.1 | 266.5 | 269.0 | 268.0 | 269.0 | 268.0 |
| | Launch angle (°) | 11.1 | 11.2 | 11.1 | 11.3 | 10.9 | 11.3 |
| Long Iron shot | Ball Speed (m/s) | 58.2 | 58.1 | 58.3 | 58.1 | 58.4 | 58.1 |
| | Spin rate (rpm) | 5400 | 4970 | 5100 | 4900 | 5050 | 4900 |
| | Flight distance (m) | 187.9 | 190.6 | 189.9 | 191.2 | 189.8 | 191.2 |
| | Launch angle (°) | 14.1 | 14.3 | 14.2 | 14.4 | 14.2 | 14.4 |
| Wedge Shot | Spin rate (rpm) | 6800 | 6500 | 6750 | 6700 | 6700 | 6650 |
| | Spin stability | G | E | G | E | G | G |
| | Abrasion-resistance | G | E | E | E | G | E |
| | Durability | 150+ | 150+ | 150+ | 150+ | 150+ | 150+ |

TABLE 6-2

| | | Golf ball | | | | |
|---|---|---|---|---|---|---|
| | | 7 | 8 | 9 | 10 | 11 |
| Core | Structure | 3P | 4P | 3P | 3P | 4P |
| | Core No. | 7 | 8 | 9 | 10 | 11 |
| | Hardness difference (Hs − Ho) | 28 | 36 | 25 | 25 | 41 |
| Cover | Thermoplastic polyurethane (A) | — | — | — | — | — |
| | Elastollan XNY90A | — | — | — | 100 | — |
| | Elastollan XNY75A | 100 | 100 | — | — | 100 |
| | Elastollan ET880 | — | — | 100 | — | — |
| | Polyisocyanate mixture (B) | — | — | — | — | — |
| | 1 [NCO % = 0.7] | — | — | — | — | — |
| | 2 [NCO % = 0.4] | — | 35 | — | — | 35 |
| | 3 [NCO % = 0.7] | — | — | 20 | — | — |
| | 4 [NCO % = 0.4] | — | — | — | — | — |
| | 5 [NCO % = 10.0] | 1.4 | — | — | 1.4 | — |
| | 6 [NCO % = 8.9] | — | — | — | — | — |
| | Filler (Titanium oxide) | 4 | 4 | 4 | 4 | 4 |
| | Thickness (mm) | 0.3 | 0.5 | 0.2 | 0.8 | 0.3 |
| | Slab hardness (Shore D) | 20 | 38 | 26 | 26 | 38 |
| | Molding method | Inj. | Inj. | Inj. | Inj. | Comp. |
| Golf Ball | Surface hardness (Shore D) | 68 | 67 | 58 | 57 | 68 |
| | PGA compression | 107 | 108 | 100 | 98 | 110 |
| Driver Shot | Ball Speed (m/s) | 77.0 | 77.4 | 76.7 | 76.6 | 77.7 |
| | Spin rate (rpm) | 2350 | 2330 | 2400 | 2700 | 2200 |
| | Flight distance (m) | 269.5 | 270.1 | 266.0 | 261.5 | 270.9 |
| | Launch angle (°) | 11.1 | 11.4 | 11.1 | 10.7 | 11.5 |
| Long Iron shot | Ball Speed (m/s) | 58.3 | 58.3 | 58.1 | 58.1 | 58.4 |
| | Spin rate (rpm) | 5000 | 5060 | 5300 | 5700 | 4900 |
| | Flight distance (m) | 190.4 | 190.4 | 188.5 | 186.1 | 191.7 |
| | Launch angle (°) | 14.3 | 14.4 | 14.0 | 13.6 | 14.6 |
| Wedge Shot | Spin rate (rpm) | 6850 | 6600 | 6650 | 7150 | 6510 |
| | Spin stability | E | E | G | G | E |
| | Abrasion-resistance | E | E | E | E | E |
| | Durability | 150+ | 150+ | 150+ | 150+ | 150+ |

TABLE 7

|  |  | Golf ball | | | |
|---|---|---|---|---|---|
|  |  | 12 | 13 | 14 | 15 |
| Core | Structure | 3P | 3P | 3P | 3P |
|  | Core No. | 12 | 13 | 14 | 15 |
|  | Hardness difference (Hs – Ho) | 12 | 28 | 11 | 12 |
| Cover | Thermoplastic polyurethane (A) | — | — | — | — |
|  | Elastollan XNY90A | 100 | — | — | — |
|  | Elastollan XNY75A | — | 100 | — | — |
|  | Elastollan ET880 | — | — | 100 | 100 |
|  | L.M.Polyisocyanate mixture (B) | — | — | — | — |
|  | 1 [NCO % = 11.2] | 1.3 | — | 1.3 | — |
|  | 2 [NCO % = 11.0] | — | 1.3 | — | — |
|  | 3 [NCO % = 8.4] | — | — | — | 1.7 |
|  | Filler (Titanium oxide) | 4 | 4 | 4 | 4 |
|  | Thickness (mm) | 0.7 | 1.2 | 0.5 | 1.0 |
|  | Slab hardness (Shore D) | 38 | 20 | 26 | 32 |
|  | Molding method | Inj. | Inj. | Inj. | Inj. |
| Golf | Surface hardness (Shore D) | 48 | 62 | 50 | 47 |
| Ball | PGA compression | 92 | 94 | 96 | 90 |
| Driver Shot | Ball Speed (m/s) | 76.4 | 76.5 | 76.5 | 76.3 |
|  | Spin rate (rpm) | 2900 | 2700 | 2950 | 3000 |
|  | Flight distance (m) | 257.0 | 260.0 | 258.0 | 255.0 |
|  | Launch angle (°) | 10.5 | 10.7 | 10.4 | 10.4 |
| Long Iron shot | Ball Speed (m/s) | 58.0 | 58.0 | 58.0 | 57.9 |
|  | Spin rate (rpm) | 5900 | 5600 | 5800 | 6150 |
|  | Flight distance (m) | 184.1 | 186.0 | 184.9 | 183.7 |
|  | Launch angle (°) | 13.4 | 13.7 | 13.5 | 13.2 |
| Wedge Shot | Spin rate (rpm) | 7100 | 7200 | 7000 | 7100 |
|  | Spin stability | F | F | F | F |
|  | Abrasion-resistance | F | F | P | P |
|  | Durability | 90 | 150+ | 130 | 100 |

Note on Tables 6 to 7
Formulation: parts by mass
3p: 3 piece golf ball, 4p: 4 piece golf ball
L.M. polyisocyanate mixture (B): Low molecular weight polyisocyanate mixture (B)
Wedge shot: Approach wedge shot The golf balls Nos. 1 to 11 each had a cover formed from a cover composition which contained the thermoplastic polyurethane (A) and the polyisocyanate mixture (B) in which the urethane prepolymer (b-1) having at least two isocyanate groups or the polyisocyanate (b-2) having at least three isocyanate groups is dispersed in the thermoplastic resin (b-3) which substantially does not react with an isocyanate group, wherein the cover composition has a slab hardness of 60 or less in Shore D hardness and the core has a hardness difference between the surface hardness Hs and the center hardness Ho (Hs–Ho) of from 15 to 50 in Shore D hardness. These golf balls showed a high launch angle, a low spin rate, and long flight distance when hitting a driver shot or a long iron shot. Further, at an approach wedge shot, a high spin rate was stably maintained. Furthermore, it was understood that the golf balls were also excellent in the abrasion resistance and durability. With respect to the golf balls Nos. 1 and 10 among them, since the covers were molded to be relatively thick, the ball speed tended to be slow; the spin rate to be high; and thus the flight distance to be slightly short.

The golf balls Nos. 12 to 15 each had a cover formed in a manner that the thermoplastic polyurethane (A) was post-crosslinked with a low molecular weight polyisocyanate. All of these golf balls had a high spin rate and short flight distance when hitting a driver shot and a long iron shot, as compared with the golf balls Nos. 1 to 11. Further, at an approach wedge shot, the spin stability was poor, although a high spin rate was achieved. Furthermore, it was understood that the golf balls were also poor in the abrasion resistance and durability.

The present invention provides a golf ball that makes the flight distance when hitting a driver shot or a long or middle iron shot compatible with the controllability at the approach wedge shot with a short iron. Further, the golf ball of the present invention is excellent in abrasion resistance of the cover. This application is based on Japanese Patent application No. 2007-291124 filed on Nov. 8, 2007, the contents of which are hereby incorporated by reference.

What is claimed is:
1. A golf ball comprising
a core consisting of a center and at least one intermediate layer covering the center, and a cover covering the core,
wherein the cover is formed from a cover composition containing, as a resin component, a thermoplastic polyurethane (A) and
a polyisocyanate mixture (B) in which a urethane prepolymer (b-1) having at least two isocyanate groups or a polyisocyanate (b-2) having at least three isocyanate groups is dispersed in a thermoplastic resin (b-3) which does not substantially react with an isocyanate group; and
wherein a number average molecular weight of a polyol component constituting the urethane prepolymer (b-1) is 650 or more,
the polyisocyanate (b-2) is an isocyanurate of a diisocyanate,
the intermediate layer has a slab hardness of 61 or more in Shore D hardness,
the cover composition has a slab hardness of less than 30 in Shore D hardness,
the cover has a thickness of from 0.1 mm to 0.8 mm, and
the core has a hardness difference (Hs–Ho) between a surface hardness Hs and a center hardness Ho of from 15 to 50 in Shore D hardness,
wherein the polyisocyanate mixture (B) has an NCO content (NCO %) of 0.1 mass % to 10.0 mass % in the case that the polyisocyanate mixture (B) contains the urethane prepolymer (b-1), and
wherein the polyisocyanate mixture (B) has an NCO content (NCO %) of 5.0 mass % to 30.0 mass % in the case that the polyisocyanate mixture (B) contains the polyisocyanate (b-2).

2. The golf ball according to claim 1, wherein the urethane prepolymer (b-1) has an NCO content (NCO %) of 0.5 mass % or more and less than 10.0 mass %.

3. The golf ball according to claim 1, wherein the polyisocyanate (b-2) has an NCO content (NCO %) of 10.0 mass % to 30.0 mass %.

4. The golf ball according to claim 1, wherein the urethane prepolymer (b-1) is a bifunctional isocyanate group-terminated urethane prepolymer represented by the following formula (1):

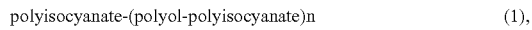

polyisocyanate-(polyol-polyisocyanate)n        (1), wherein the connecting number n is an integer of not less than 1 and not higher than 10.

5. The golf ball according to claim 1, wherein the cover composition contains the polyisocyanate mixture (B) in an amount of 1 to 50 parts by mass based on 100 parts by mass of the thermoplastic polyurethane (A).

6. The golf ball according to claim 1, wherein the mixing ratio (100% by mass in total) of the urethane prepolymer (b-1) or the polyisocyanate (b-2) to the thermoplastic resin (b-3) in the polyisocyanate mixture (B) is: (urethane prepolymer (b-1) or polyisocyanate (b-2))/thermoplastic resin (b-3)=(5% to 50% by mass)/(50% to 95% by mass).

7. The golf ball according to claim 1, wherein the thermoplastic resin (b-3) is at least one selected from the group consisting of a polyester elastomer, an acrylic elastomer, a styrene elastomer, an olefin elastomer, and a vinyl chloride elastomer.

8. A golf ball comprising
a core consisting of a center and at least one intermediate layer covering the center, and
a cover covering the core,
wherein the cover is formed from a cover composition containing, as a resin component, a thermoplastic polyurethane (A) and
a polyisocyanate mixture (B) in which a urethane prepolymer (b-1) having at least two isocyanate groups or a polyisocyanate (b-2) having at least three isocyanate groups is dispersed in a thermoplastic resin (b-3) which does not substantially react with an isocyanate group; and
wherein a number average molecular weight of a polyol component constituting the urethane prepolymer (b-1) is 650 or more,
the polyisocyanate (b-2) is an isocyanurate of a diisocyanate,
the cover composition has a slab hardness of 38 or less in Shore D hardness,
the cover has a thickness of from 0.1 mm to 0.5 mm, and
the core has a hardness difference (Hs−Ho) between a surface hardness Hs and a center hardness Ho of from 15 to 50 in Shore D hardness,
wherein the urethane prepolymer (b-1) has an NCO content (NCO %) of 0.5 mass % or more and less than 10.0 mass %,
wherein the polyisocyanate (b-2) has an NCO content (NCO %) of 10.0 mass % to 30.0 mass %, and
wherein the golf ball has a surface hardness ranging from 57 to 68 in Shore D hardness.

9. The golf ball according to claim 8, wherein the polyisocyanate mixture (B) has an NCO content (NCO %) of 0.1 mass % to 30.0 mass %.

10. The golf ball according to claim 8, wherein the urethane prepolymer (b-1) is a bifunctional isocyanate group-terminated urethane prepolymer represented by the following formula (1):

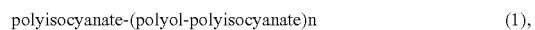

polyisocyanate-(polyol-polyisocyanate)n        (1), wherein the connecting number n is an integer of not less than 1 and not higher than 10.

11. The golf ball according to claim 8, wherein the cover composition contains the polyisocyanate mixture (B) in an amount of 1 to 50 parts by mass based on 100 parts by mass of the thermoplastic polyurethane (A).

12. The golf ball according to claim 8, wherein the mixing ratio (100% by mass in total) of the urethane prepolymer (b-1) or the polyisocyanate (b-2) to the thermoplastic resin (b-3) in the polyisocyanate mixture (B) is: (urethane prepolymer (b-1) or polyisocyanate (b-2))/thermoplastic resin (b-3)=(5% to 50% by mass)/(50% to 95% by mass).

13. The golf ball according to claim 8, wherein the thermoplastic resin (b-3) is at least one selected from the group consisting of a polyester elastomer, an acrylic elastomer, a styrene elastomer, an olefin elastomer, and a vinyl chloride elastomer.

* * * * *